United States Patent [19]

Pitroda et al.

[11] Patent Number: 4,627,047
[45] Date of Patent: Dec. 2, 1986

[54] INTEGRATED VOICE AND DATA TELECOMMUNICATION SWITCHING SYSTEM

[75] Inventors: Satyan G. Pitroda, Downers Grove; Bakulesh A. Mehta, Bolingbrook; William A. Fechalos, Naperville, all of Ill.

[73] Assignee: Rockwell International Corp., El Segundo, Calif.

[21] Appl. No.: 337,643

[22] Filed: Jan. 7, 1982

[51] Int. Cl.⁴ ............................................. H04Q 11/04
[52] U.S. Cl. .................................... 370/58; 370/110.1
[58] Field of Search ............. 370/58, 85, 110.1, 110.3; 179/2 DP

[56] References Cited

U.S. PATENT DOCUMENTS

| | | | |
|---|---|---|---|
| 4,146,749 | 3/1979 | Pepping et al. | 370/58 |
| 4,322,843 | 3/1982 | Beuscher | 370/58 |
| 4,370,743 | 1/1983 | Moran | 370/60 |
| 4,381,427 | 4/1983 | Cheal et al. | 370/110.1 |
| 4,408,323 | 10/1983 | Montgomery | 370/58 |
| 4,413,337 | 11/1983 | Dauphin et al. | 370/58 |

Primary Examiner—Douglas W. Olms
Assistant Examiner—Kenneth I. Rokoff

Attorney, Agent, or Firm—Carmen B. Patti; V. Lawrence Sewell; H. Fredrick Hamann

[57] ABSTRACT

An improvement is disclosed for telecommunication PCM time division multiplex switching systems of the type having voice access ports, each with a voice path and a signalling path, and having PCM signalling and voice transmit buses to carry information to a switching network. From the network, PCM voice receive buses carry switched voice information to be demultiplexed, converted to analog form and connected to the voice port. A signalling bus carries information from the switching network to registers. The system is improved to enable it to switch data as well as voice information. A data port is provided to accompany each voice port, and the improved system includes means for multiplexing input data at the port and inserting it on the signalling transmit bus once the signalling portion of a call is completed. A receive data bus connects the signalling receive bus to means for demultiplexing data and presenting it to receive data ports. In a system where signalling and voice bits are synchronized on the transmit buses and the bits are switched together at a common location in switching network memory, the voice and data bits are likewise switched together to a common destination.

13 Claims, 11 Drawing Figures

INTEGRATED VOICE AND DATA TELECOMMUNICATION SWITCHING SYSTEM

BACKGROUND OF THE INVENTION

The invention disclosed herein pertains generally to telecommunications switching systems and more particularly to a system having the capability of simultaneously switching voice information and data information coupled to such system via separate subscriber voice lines and data lines.

The switching system described herein is a PCM time division multiplex system designed to accept analog voice information and convert it into corresponding digital representations for subsequent network switching and reconversion into the analog form. Such a PCM switching technology is explained in "A review of Telecommunications Switching Concepts—Part 1 and Part 2 thereof, published in *Telecommunications* February, 1976 and March, 1976 respectively.

Such systems allocate dedicated time paths for carrying digital words representative of corresponding analog voice samples. The majority of these systems are designed for switching analog voice information in the range of about 300 Hz to 4 KHz. To obtain an adequate sampling rate, such a PCM system samples a plurality of analog voice signals at a typical 8 KHz rate, i.e. every 125 microseconds. The samples are encoded into eight-bit digital words.

Early attempts at switching digital data information exclusively through the voice channels of such PCM systems were successful, but only at the expense of denying the use of those channels for PCM voice transmission. Without equipment to synchronize the transmitted digital data with the switching system sampling rate, only asynchronous data up to 4 kilobits per second (Kbs) could be sampled and switched accordingly.

While technical developments have led to the availability of synchronizing equipment capable of being interfaced with the voice ports for collecting and storing the data bits and supplying the same to the PCM system in synchronism with the system clock, such advancements have allowed the systems to switch data rates only in the order of about 8 Kbs or less, and with a sacrifice in voice channel capacity.

One of the most popular methods o transmitting digital data is by way of the data modem interface. Such a device adapts a remote data terminal to the voice grade telephone line of a switching system by remotely transforming the digital data into frequency modulated analog signals, all within the voice frequency spectrum, and transmitting the same over the telephone lines. In this application the analog voice port is utilized, without modification, to couple the frequency modulated signals to the switching system for processing and switching as any other voice signal. In establishing a switching system network connection the data terminal user dials a destination directory number, and after a successful cut-through to the destination equipment, data information may be transferred but again to the exclusion of voice information transmission. The intermediate switching system is unaware whether voice or frequency modulated data signals are being switched.

Other methods of switching digital information involve "stealing" a few voice PCM channel time slots and inserting therein digital data bits. While this method allows one to switch voice and data information simultaneously, the quality of the voice transmission is compromised. This compromise in quality is obvious in view that there are fewer digital bits representing quantum changes in the corresponding analog sample.

It is thus seen that attempts have been made to modify present PCM digital switching systems to accommodate the transmission of digital data. However, these modifications, by and large, involve a compromise in the transmission quality or the number of voice transmission channels.

It is, therefore, a primary object of the present invention to provide a PCM switching system having the capability of switching voice and data information simultaneously without a compromise in voice quality or the number of voice channels.

It is another object of the invention to provide a PCM telecommunications switching system capable of switching asynchronous data appearing at the data ports, at rates in excess of 8 Kbs.

It is another object of the present invention to provide a PCM telecommunication switching system with data port time channels uniquely associated with voice port time channels so that a network connection established for a voice connection automatically establishes data connection to the same destination. This permits communication with a distant location simultaneously using a telephone set for voice and a data terminal for data.

A feature of the present invention is to integrate voice and data hardware so that the data switching capabilities of the system may be invoked without the use of special services or access codes.

The foregoing as well as other objects and advantages will become apparent by referring to the detailed description of the preferred embodiment, which follows hereinafter, together with the appended drawings.

BRIEF DESCRIPTION OF THE INVENTION

In accordance with the foregoing objects, the invention herein disclosed is directed to a digital telecommunication switching system of the time division multiplex type, wherein all information coupled thereto is converted into digital bits or words for processing and switching. Simultaneous voice and data information is accommodated by providing a data port associated with each voice port or subscriber line. Each communication system subscriber then has the option of using the system for voice or data transmission purposes, or both.

To accomplish this result, an exemplary 768-TDM channel system is provided with the traditional analog-to-digital converters, multiplexing equipment and TDM buses for routing and switching PCM voice information from originating ports, through a digital network, to a desired destination port. However, the switching system is further adapted for simultaneous data transmission by providing a TDM data channel, separate and apart from the PCM voice channel, for each data port. In addition, the timing signals controlling the various TDM buses within the system are common to both voice TDM buses and data port TDM buses. Therefore, the PCM voice time slots and the associated data time slots undergo similar system multiplexing and demultiplexing to maintain a coincidence of time intervals. At the switching network switching level, the PCM voice word is combined with the data information bit to form a resultant word switched through a digital network connection, whereby the voice and data information are switched simultaneously and switched to the same destination.

In the preferred embodment the eight-bit PCM voice word is comprised of one polarity sign bit and seven bits representative of the analog voice amplitude. Accompanied therewith at the network level is one bit of data information and one bit of parity information to form a composite ten-bit word coterminous with a digital network memory word length of ten bits.

While the invention has been shown and will be described with reference to specific exemplary embodiments of methods and apparatus, there is no intention that it thus be limited to the particular aspects or details of such embodiments. On the contrary, it is tended here to cover all modifications, alternatives, equivalents and subcombinations which fall within the spirit and scope of the invention as defined by the appended claims.

DETAILED DESCRIPTION OF THE INVENTION

Figure 1:
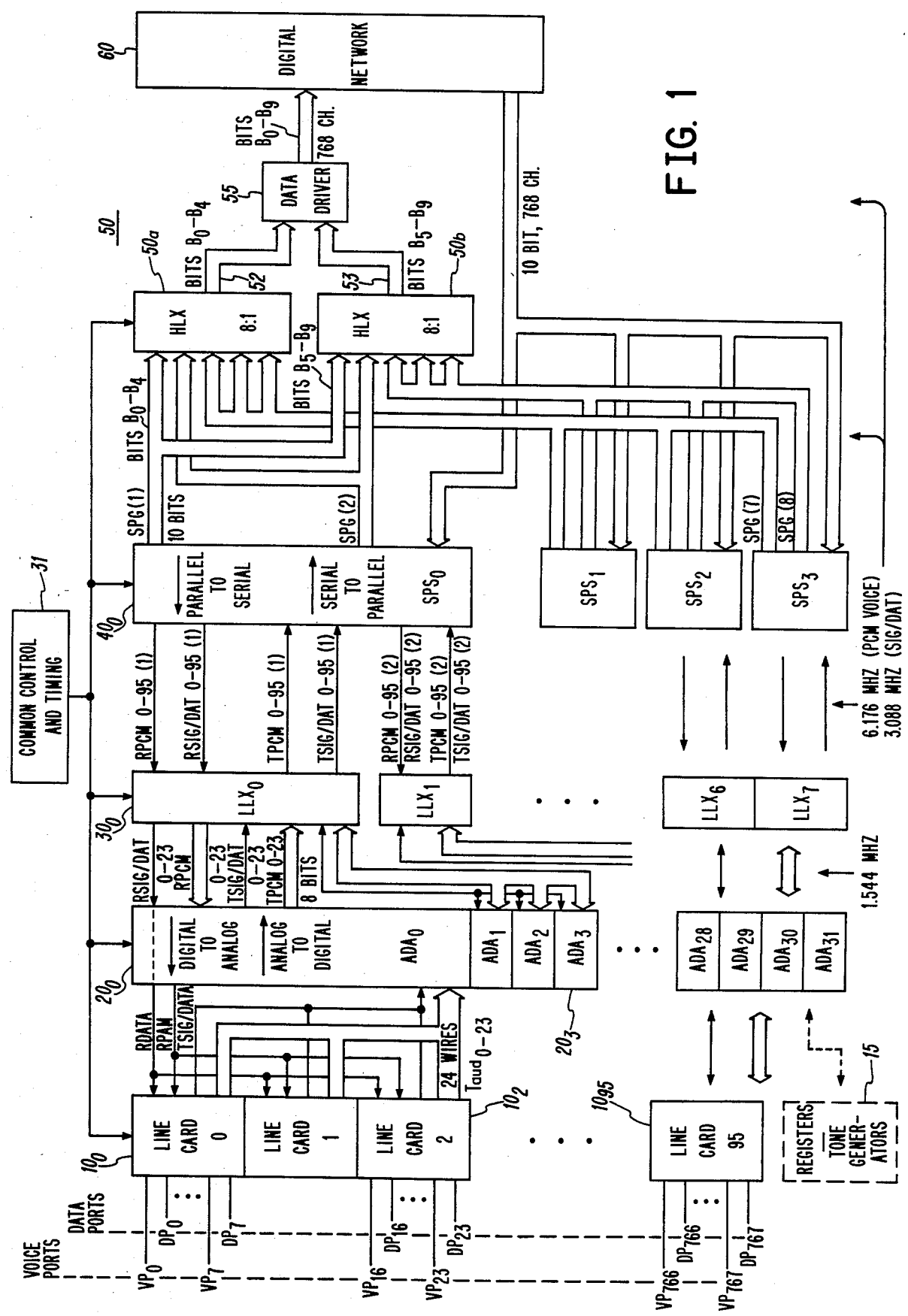
FIG. 1 is a generalized block diagram of a portion of an exemplary 768-channel PCM time division multiplexed communication system, illustrating the combined voice and data information bus architecture.

Turning now to FIG. 1 there are shown block portions of a PCM time division multiplex (TDM) switching system in which the present invention may be embodied. Such a communication system typically interfaces blocks of twenty-four voice ports $VP_0$–$VP_{23}$ to the system by way of subscriber line cards $10_0$–$10_2$. Each voice port has a dedicated physical appearance on a line card, and in addition, occupies a dedicated time position within the TDM bus structure of the system. In a system having a sufficient number of time division multiplex channels to accommodate all voice ports, there naturally exists the capability of providing a simultaneous network connection for each voice port appearance. Such a system network is known as "nonblocking" network. Other systems, of the "blocking" type, provide more voice port appearances than TDM channels, which type of course, cannot provide communcation services to all users simultaneously. In this choice of operation a basic assumption is made that the probability of all subscriber lines becoming active at the same time is remote, and the resultant denial of service can be tolerated.

The preferred embodiment of the invention will be discussed herein in terms of a "nonblocking" system but it should be understood that the concpts of the invention are not limited to this type of communications switching system. It should also be understood that the use of the terms "data information" or "digital data" throughout this disclosure refers to information communicated to the data ports and should not be confused with the terms "digital words" which are used in PCM switching systems to characterize external voice signals and digital data within the system. Similarly, the terms data or PCM voice "channel" or "time slots" connote a period of time in a time division multiplex system which is allocated solely to the transfer of information of a particular voice port or data port.

The exemplary 768 channel PCM system shown in FIG. 1 is partitioned to specifically highlight a block of twenty-four standard subscriber lines. This choice of partitioning is a result of the widespread use of the twenty-four channel T1 carrier D3 format in North America. The processing of the voice information throughout the exemplary TDM system will not be discussed in detail where the switching system processes such information in a manner known to those skilled in the art. At the outset it should be noted in the drawings the use of the convention that TDM buses drawn with single lines represent serial buses, and TDM buses drawn with wide-body lines represent parallel buses.

As a prefatory observance to the detailed description of FIG. 1, it should be generally noted that in the exemplary PCM time division multiplex switching system, signalling information, in the form of dial pulses, is extracted from the subscriber voice line within the line card and processed thereafter in distinct time slots of separate buses throughout the system. The system as a whole is structured to convert analog voice signals from a plurality of voice ports into PCM digital words, and through successive multiplexing, converge the digital words from a multiplicity of low level serial buses into a few high density parallel buses directed toward the digital network.

Within the digital network selective connections are established to route any PCM voice word in one time channel to the appropriate output destination channel so that a two-way communication path may be set up between any two telephone sets served by the system. The details of the digital network are known to those skilled in the art, and need not be further described here. It is also known in the art how a common control unit 31 is constructed to supply the necessary control signals, via the various timing lines, to synchronize the various converters and multiplexers and direct the network to establish and remove connections.

In the exemplary small 768-channel PCM switching system there are four groups of one hundred and ninety two voice ports each such group of which is further divided into eight subdivisions of twenty-four voice channels. To simplify the pictorials, FIG. 1 specifically illustrates only one such subdivision of voice channels $VP_{0-23}$. In accordance with the primary aspects of the present invention there is also shown an associated twenty-four data ports $DP_{0-23}$.

It is significant to note at this point that insofar as the transmission of voice port supervisory and control signalling information, and data port information occur at different times, the various system buses dedicated to such information are shared for use thereby. With that in mind, signalling information in the form of dial pulses is extracted from the voice paths (within the line cards $10_0-10_2$) and imposed upon the TSIG/DAT bus to be connected to a dial pulse register via a first digital network connection. After the common control has established a second network connection (talk and data connection) pursuant to the dial pulse information, digital data is communicated from the originating data port to be switched to the destination data port via the second network connection. During the second connection, data information is communicated between the line cards and the switching network on the paths such as TSIG/DATA which were used for signal information during the first connection.

Emanating from each of the three line cards $10_0-10_2$ and directed toward the respective analog-to-digital converter (ADA) $20_0$ is one 24-wire parallel bus $Taud_{0-23}$ (audio) and one serial bus RSIG/DAT (signalling-/data). The nomenclature of bus names used herein identify signals received by the subscriber as "R" and those transmitted by the subscriber as "T".

The discussion which immediately follows considers first a voice and digital data information flow toward the digital network and then a reverse flow of the resultant switched information. The upper frequency limit of voice signals passable by most telecommunication switching systems is four kilohertz. According to well-known sampling theories such an analog waveform can be digitally represented if samples are taken at least every 125 microseconds (8 Khz), which is the case with the illustrated system. Therefore, the cyclic basis of all sampling, multiplexing and demultiplexing revolves around the basic system clock rate of 8 Khz, or 125 us.

Before proceeding further with a detailed discussion respecting the bus architecture of the exemplary switching system of FIG. 1, an understanding thereof will be facilitated by first reviewing the overall system structure. As noted, the exemplary system services 768 voice ports (and thus subscriber lines) along with the associated 768 data ports. Ninety-six line cards each servicing eght voice and data lines, are required for a fully equipped system. As will be discussed later, some line card positions, and thus their associated time channels, may be dedicated to the use of digital tone generators, dial pulse registers, and the like as noted by the dotted block at the bottom left-hand corner of FIG. 1. Assuming for purposes of simplicity that a full complement of line cards is used, it is noted in FIG. 1 that ninety-six line cards are required to service the illustrated 768 subscriber and data port lines. The eight analog outputs of each line circuit of each of the three blocks of line cards $10_0-10_2$ forms a twenty-four wire bus $Taud_{0-23}$ connected to an analog to digital converter $20_0$. Such converters convert PAM signals into PCM voice words. The subscriber line signalling circuits and the data ports corresponding to the same block of line cards share the serial twenty-four channel bus TSIG/DAT also connected to the mentioned analog to digital converter.

The remaining ninety-three line cards are similarly grouped and are connected to an associated thirty-one analog to digital converters. Following the ADA circuits are a total of eight low level multiplexer circuits for converging the information from a preceding four ADA circuits into a serial ninety-six channel PCM voice bus and a serial ninety-six channel serial signal/-data bus. Emanating from the low level multiplexer circuits and directed to the serial to parallel converters are eight ninety-six channel voice and signal/data buses.

The entire 768 channel system utilizes four serial to parallel converters (SP). Each SP converter accepts two 96-channel serial PCM voice inputs, and outputs two 96-channel parallel buses. At the SP level the PCM voice and signal/data bits are parallelized together to form a resultant 10-bit word. Each 10-bit parallel output bus is physically split into a high and low order bit bus before being connected to a high level multiplexer circuit.

One high level multiplexer (HLX), comprised of one low order bit multiplexer 50a (bits 0-4) and one high order bit multiplexer 50b (bits 5-7, signal/data and parity), is provided to accept the outputs of four SP converters to develop the final 10-bit parallel 768-channel bus. A data driver is interposed between a digital network and the HLX to merge the two five-bit buses and drive the information memories of the digital network. The theory of operation of digital networks utilizing information and connection memories is fully described in the previously mentioned article as well as U.S. Pat. No. 4,146,749 entitled "Telecommunications Network Having Multi-Function Spare Network Block". The disclosure of the referenced patent is incorporated by reference thereto as a part of the present specification to the same extent as if fully set forth herein.

The digital 10-bit words, which include PCM voice, signal/data and parity bits, are sequentially written into the information memory locations during the time channels (or time slots) associated with the line card voice and data ports, and read thereout only during the time slot associated with the destination port. The writing of information is executed sequentially from address 0 to 767 to store at each address ten bits (one word) representative of information at ports 0 to 767. The information memory locations are read in accordance with addresses located in connection memories not shown.

By way of example, assume a connection between access port five and eight is desired. Information is written into information memory location five during time slot five and into location eight during time slot eight. A "connection" is established between five and eight by writing the time slot eight address in connection memory address for access port five. Similarly, the time slot five address is written into the connection memory address for access port eight. During the access port five time slot, the address for access port eight is read from the connection memory to address the information memory and read the information from the access port eight location. In like manner, access port five information is read during the access port eight time slot. The repetitive nature of the foregoing in exchanging words between the two access ports provides a network digital "connection" between the ports without the existence of a metallic cross-connect.

Returning to the system building block description, the 768-channel 10-bit parallel network output is directed to all the parallel to serial (PS) converters, each of which extracts words from time slots associated with access ports remotely serviced by the rticular PS converter. The low level demultiplexers accept the PCM voice and signal/data 96-channel serial buses from the PS converters for generating four parallel 24-channel PCM voice buses and four corresponding time-related serial signal/data buses. Each pair of PCM voice and signal/data buses is then connected to a digital to analog converter.

From each digital to analog converter there is extended toward respective line cards a serial twenty-four channel voice bus and a time-related serial twenty-four channel data bus. Signalling information returning from the network is never extended to the line card level but rather finds a storage register destination the description of which follows later. Timing pulses, unique to each block of line cards, extract voice and data information from one of the twenty-four serial time channels for filtering (PAM to analog) or direct transfer (data) to the access port associated with that time channel.

The foregoing typifies the structural makeup of the exemplary 768 channel switching system capable of carrying and switching PCM voice and data information. The ensuing description further details the system bus architecture whereby simultaneous voice and data switching is accommodated.

TRANSMIT BUS ARCHITECTURE

Line Card to A/D Converter

In discussing the timing relationship of the information carried on the buses connecting the ADA $20_0$ and the line cards $10_0$–$10_2$, reference should be made to FIG. 1 where the twenty-four channel TSIG/DAT bus is shown wire OR'ed to all three line cards $10_0$–$10_2$. While all voice signals appear at the ADA $20_0$ inputs simultaneously, the TSIG/DAT serial bus delivers signalling or data information to the ADA$20_0$ in twenty-four serial time channels recurring every 125 us. In essence, each of the twenty-four signal/data leads are sequentially sampled once every system cycle and carried, unprocessed, through the ADA $20_0$ to the low level multiplexer (LLX) $30_0$ where, combined therewith in the same 125 us interval, are seventy-two other bits of signal/data information. The signal/data bits are however, temporarily delayed in the ADA converters until the voice analog to digital conversion is complete in which event the PCM voice word and the associated signal/data bits are outputted.

Figure 2:
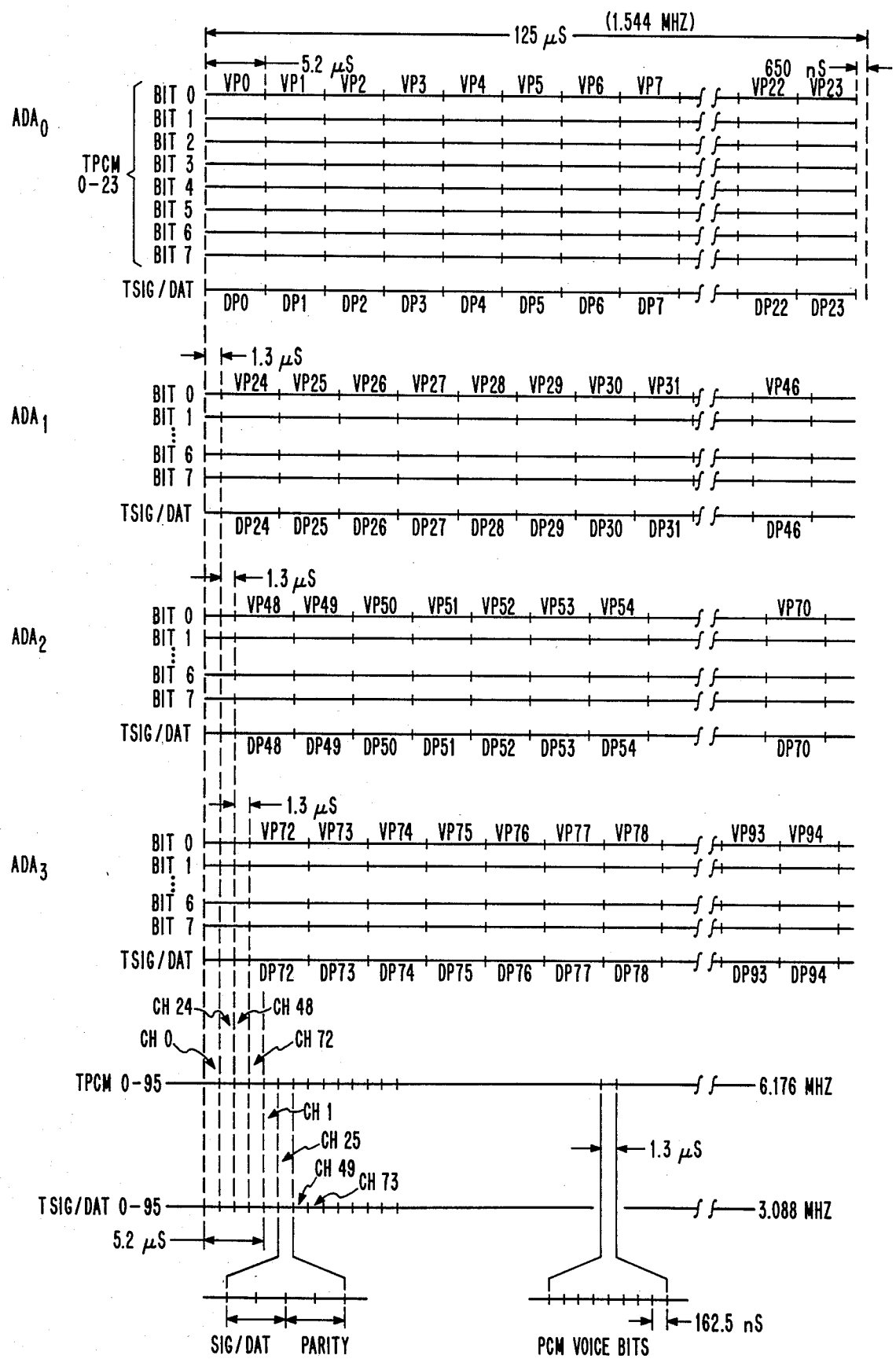
FIG. 2 is a waveform timing chart which illustrates the PCM voice and the associated data channel low level multiplexing scheme utilized to combine four of twenty-four channel parallel information into a single ninety-six channel serial bus.

Each of the four illustrated analog to digital converters $20_0$–$20_3$ cyclically samples each of its respective twenty-four input voice leads Taud$_{0-23}$ once every 125 us to convert the sample amplitudes into representative digital words comprised of seven bits voice amplitude information and one bit of polarity information. Coincident in time with each eight-bit word (7 bits amplitude and 1 sign bit) is the signal/data bit on the TSIG/DAT bus. The composite word (albeit on two buses) is a 9-bit parallel word. FIG. 2 broadly illustrates the ADA output in addition to the system cycle time having tweny-four 5.2 us subdivisions thereof to accommodate the corresponding twenty-four digital words. The output of each ADC $20_0$–$20_3$ is shown in the noted figure skewed in time by 1.3 us. A 650 ns interval remaining after the 24th (CH23) channel of each framing interval (125 us) constitutes a framing bit interval for D3 transmission format synchronization purposes.

Directing attention again to FIG. 1 and in particular to the low level multiplexer $30_0$, it is seen that the four ADA$_{0-3}$ parallel buses culminate at the low level multiplexer $30_0$ input. Each such bus is a parallel eight-wire bus for carrying the corresponding eight bits of the PCM word. Also noted, the bit rate of the PCM bits transmitted between the ADA and the low level multiplexer 30 is the T1 carrier rate of 1.544 MHz. It is therefore the task of each low level multiplexer to further concentrate groups of four PCM and signal/data buses, timewise, into corresponding 96-channel serial buses. While eight low level multiplexers $30_0$–$30_7$ are utilized in the illustrated 768-line switching system to converge thirty-two 24-channel buses (TPCM 0-23) into eight 96-channel buses, only the operation of one such multiplexer will be discussed.

TRANSMIT BUS

Low Level Multiplexer

With particular attention directed to FIG. 2, the multiplexing technique of the first order multiplexer $30_0$ is graphically shown. As noted, TPCM 0-23 is an eight wire bus, time divided into twenty-four (0-23) channels. Within each channel, ADA$_0$ sequentially impresses one PCM word corresponding to each of the twenty-four subscriber voice ports VP$_{0-23}$. Each voice port is therefore allocated 5.2 us of time on the TPCM 0-23 bus in which to transmit one eight-bit PCM word representative of an analog sample. With four analog to digital converters ADA$_0$–ADA$_3$ extending such a 24-channel bus to the first order multiplexer $30_0$, the channel timing of each of the four ADAs is skewed to facilitate the multiplex timing of the four parallel buses (TPCM 0-23, TPCM 24-47, TPCM 48-71, TPCM 72-95) into one serial bus TPCM 0-95. This skewing aspect is noted at the left-hand portion of FIG. 2 wherein VP$_{24}$ channel (ADA$_1$) is shown displaced from VP$_0$ channel (ADA$_0$) by 1.3 us. Similarly, VP$_{48}$ channel (ADA$_2$) is delayed 1.3 us from VP$_{24}$ channel (ADA$_1$), and VP$_{72}$ channel (ADA$_3$) is delayed from VP$_{48}$ (ADA$_2$) by a corresponding 1.3 us.

It is observed that within the first 5.2 us of the 125 us frame, the information of the first channel associated with each of the converters ADA$_0$–ADA$_3$ is available for multiplexing into a 5.2 us time slot. The bottom of FIG. 2 illustrates the TPCM 0-95 serial bus having multiplexed thereon, in the first four 1.3 us time slots, the consecutively occurring PCM voice information of the associated voice ports VP$_0$, VP$_{24}$, VP$_{48}$, and VP$_{72}$. It may be visualized that the PCM 8-bit words existing on the parallel TPCM buses are simultaneously sampled during the first 1.3 us of their 5.2 us duration and placed, in a serial fashion, within the 1.3 us interval on the serial 96-channel bus.

By comparison of the PCM voice channels, it is noted that each has an associated time coincident signal/data channel. The data channels or time slots are intimately associated with their corresponding PCM voice channels, in a time manner, throughout the entire switching system. It is this aspect of the present invention which allows a network voice connection to automatically set up a data connection. The details of this aspect will be discussed in more detail later.

While each PCM voice 5.2 us channel on the parallel TPCM 0-23 bus accommodates eight bits (because of the eight wires), such a corresponding time period for signal/data information accommodates only one information bit. However, the multiplexed bus TSIG/DAT 0-95 contains not only the signal/data bit, but also a parity bit. Parity is computed over all eight PCM voice bits and the associated signal/data bit. Even more importantly, and as represented on the expanded section of the TSIG/DAT 0-95 timing chart of FIG. 2, the SIG/DAT bit is duplicated within the first two segments of the 1.3 us slot, and the parity is dulicated in the last two segments of the slot. The redundant transmission of these bits significantly reduces the data transmission failure rate.

Further to the waveform timing chart at the bottom of FIG. 2, there is illustrated that, for each 8-bit PCM voice word, each TPCM 0-95 slot is divided into eight 162.5 ns segments for inserting therein one bit of the digital PCM word. A 162.5 ns interval corresponds to a transmission bit rate of 6.176 MHz. This is not the case, however, with the TSIG/DAT 0-95 bus where similar 1.3 us SIG/DAT slots are divided into only four 325.5 ns intervals in which the mentioned duplicated SIG/DAT and parity information are carried. Hence, the TSIG/DAT 0-95 serial bus transmission rate is only one-half that of the TPCM 0-95 bus, to wit: 3.088 MHz.

In summary, the low level multiplexer $30_0$ concentrates the four parallel PCM voice buses TPCM 0-95, and the four associated SIG/DAT parallel buses TSIG/DAT 0-23, in time, into the single associated buses TPCM 0-95 and TSIG/DAT 0-95 respectively.

The foregoing exemplifies the convergence of information on ninety-six access ports into one serial 96-channel bus. There are, however, seven other groups of ninety-six voice and data ports (96-767) to deal with in order to make the illustrated switching system complete. In the interest of brevity it should be noted that the system hardware, as heretofore alluded to, is duplicated to provide switching facilities for the other 672 voice and associated data ports. The result of this duplication (partially shown in FIG. 1) is an additional 96-channel bus extending from another low level multiplexer ($LLX_1$) to the serial to parallel (SP) converter $40_0$. Four additional ADA converters (not shown) supply $LLX_2$, with four 24-channel buses for multiplexing into the respective 96-channel TPCM 0-95(2) and TSIG 0-95(2) buses. Moreover, twenty-four additional ADA converters supply PCM voice words and signal/data information to a respective six other low level multiplexers thereby providing in total eight 96-channel buses to the system serial to parallel converters.

TRANSMIT BUS

Serial To Parallel Converter

With brief reference once again to FIG. 1 there are shown four serial to parallel (SP) converters which provide an interface between, what is considered the network portion of the system, and the PCM buses emanating from the access ports. Each SP converter $40_0$–$40_3$ accepts two 96-channel serial PCM voice and signal/data inputs and provides two 96-channel, parallel outputs. However, since each PCM voice word in the serial bit stream contains eight bits, and since four total SP converters feed a single high level multiplexer 50, the bit rate between the low level and high level multiplexers remains the same, although the high level multiplexer 50 handles eight times the amount of information. Accordingly, the bit rate of both the low and high level multiplexers is about 6.176 MHz, allowing about 162 nanoseconds for each bit and approximately 1300 nanoseconds for each 8-bit word. Similarly, for each signal/data and parity bit the low level and high level multiplexer bit rate is about 3.088 MHz, thereby allowing about 325 nanoseconds for each bit and again about 1300 nanosends per 4-bit word. It will be remembered that the PCM voice bus and the signal/data and parity bus, at the SP converter input, are separate buses having serial information imposed thereon.

Figure 3:
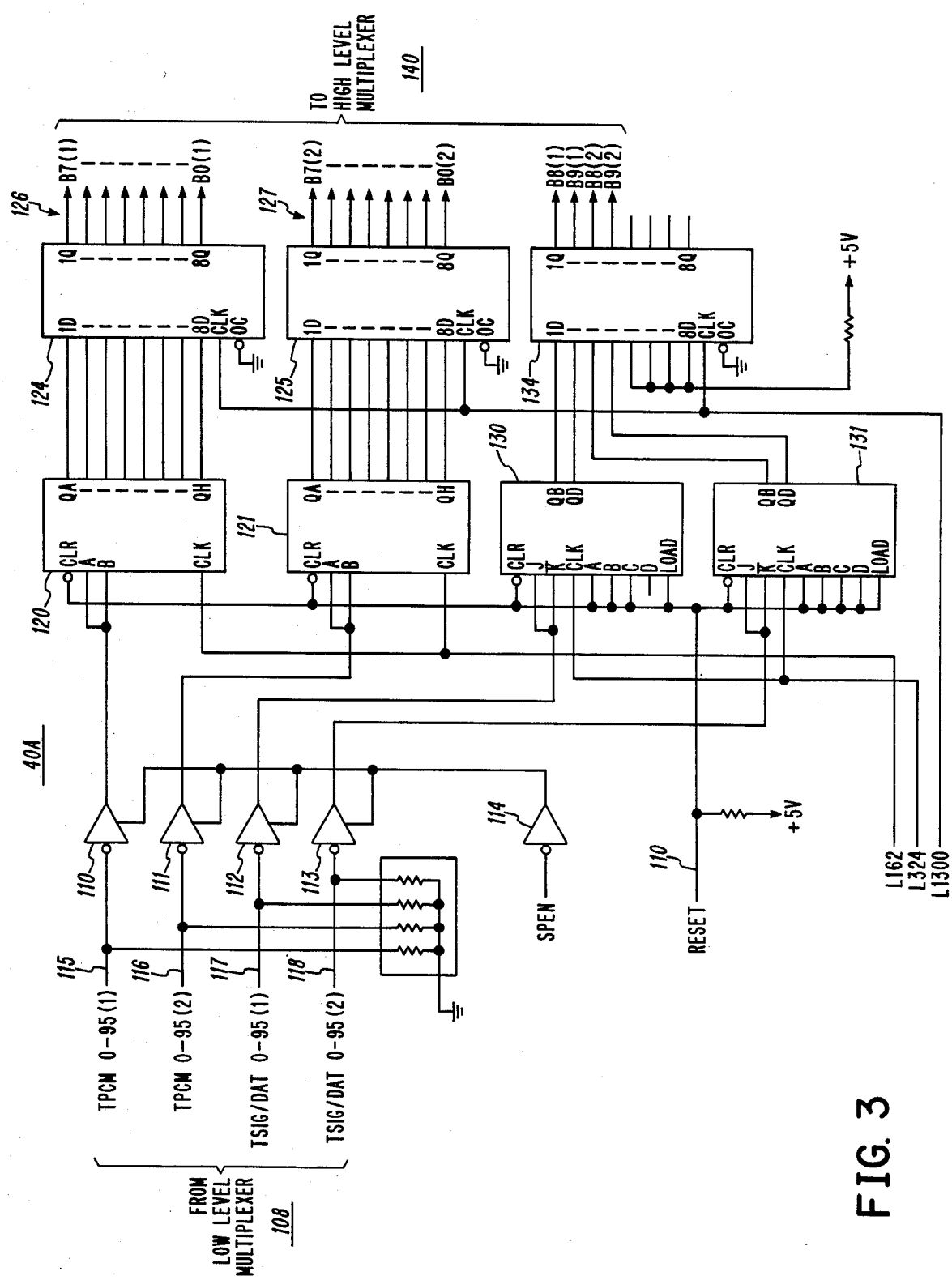
FIG. 3 is an electrical schematic drawing of the transmit portion of the serial to parallel converter interposed between the low level multiplexer and the high level multiplexer of the exemplary switching system of FIG. 1.

It is at the SP $40_0$ system level where the PCM voice and signal/data-parity bits are finally integrated into a unitary 10-bit parallel word. As specifically illustrated in FIG. 3, the SP $40_0$ receives serial information on the two 96-channel PCM voice buses TPCM 0-95(1) and TPCM 0-95(2) and the two 96-channel signal/data-parity buses TSIG/DAT 0-95(1) and TSIG/DAT 0-95(2). Graphically, the configuration and distribution of PCM information on such buses is depicted in the two serial channel timing charts at the bottom of FIG. 2 which, when taken in conjunction with FIG. 3, illustrate the manner in which the input serial buses 108 are parallelized into two 10-bit parallel output words 140. In the normal call processing mode the SP $40_0$ is allowed to function by enabling gate 114 by way of the SPEN lead. This feature permits the high impedance states of the four bus buffers 110-113 to be removed to thus connect the input buses 115-118 to the respective serial-input parallel-output shift registers 120, 121, 130, 131. By way of example, bus 115 is arranged to receive PCM voice information from low level multiplexer $30_0$, and the other PCM voice bus 116 carries PCM information from the other multiplexer $30_1$. A similar bus routing principle applies to the Tsig/dat buses.

The PCM voice information passed by the respective buffers 110, 111 is presented to the inputs of the associated 8-bit shift registers 120, 121 where each bit is clocked therein under control of a 162 nanosecond clock signal L162. When a full 8-bit word has been received, the output lines of the respective registers contain the 8-bit word in parallel form, and the word is strobed into the holding latches 124, 125 under control of a system 1300 nanosecond signal L1300. The latches 124, 125 accept the data under control of the aforementioned clock and hold it on the output lines 126, 127 in preparation for acceptance by the high level multiplexer 50.

Referring now to the signal/data and parity bits, each of those bits are sent twice during each 1300 nanosecond interval, such that they are clocked at a 324 nanosecond intervals. Thus, signal/data-parity buffers 112, 113 are provided for coupling the signal/data parity information to the respective 2-bit serial-in parallel-out shift registers 130, 131 where such bits are entered at 324 nanosecond intervals by system clock L324. The signal/data parity information, after parallelization, is then available at the output lines, and is closked into the respective registers 120, 121, 130, 131. At the end of such 1300 nanosecond interval, the latches 124, 125 and 134 are clocked to receive the parallel information and hold it for reception by the high level multiplexer 50 at the appropriate time. The outputs of register 126 form bits B0-B7 of a ten bit parallel bus SPG(1), while two outputs of register 134 form bits B8 and B9 of that bus. Registers 127 and 134 further provide bits B0-B9 of a second bus SPG(2).

The high level multiplexer 50 in turn receives the data from the holding latches 124, 125, 134 as well as similar latches of three other SP converters, in timed sequence, to thereby form a continuous stream of 10-bit parallel words. Each 10-bit word occupies a time slot of about 162 nanoseconds. It will be apparent that while this action is taking place the registers 120, 121 and 130, 131 are loading up the next word such that the cycle repeats to continuously funnel information from the low level multiplexers toward the network for eventual switching to a destination.

It should now be realized that, in the exemplary 768-line switching system there are four SPs holding a total of eighty bits of information in 1300 nanosecond intervals for further multiplexing by the high level multlexer 50. Of course, the signal/data bits are at this point associated with their partner PCM voice word by virtue of being appended thereto, in time, to form a composite parallel 10-bit word.

TRANSMIT BUS

The High Level Multiplexer

The high level multiplexer (HLX) 50 (FIG. 1), which is the final system multiplexer, essentially performs an 8-to-1 multiplexing function in converting eight 96-channel (10-bit parallel) buses into a final 768-channel (10-bit parallel) TDM bus. Furthermore, the HLX 50 is comprised of two identical multiplexer circuits 50a, 50b, one of which is wired to the low order PCM voice bits (B0-B4) and the other of which is wired to the remaining PCM voice bits and the signal/data and parity bits to form bits (B5-B9). In FIG. 1 there is illustrated the nature in which the SP/HLX circuits are interconnected by splitting both 10-bit SPG(1) and SPG(2) buses to form four 5-bit buses and connecting the high order bits to one HLX 50a and the low order bits to the other HLX 50b. Hereinafter the ten bits will simply be referred to as B0-B9.

Figure 4:
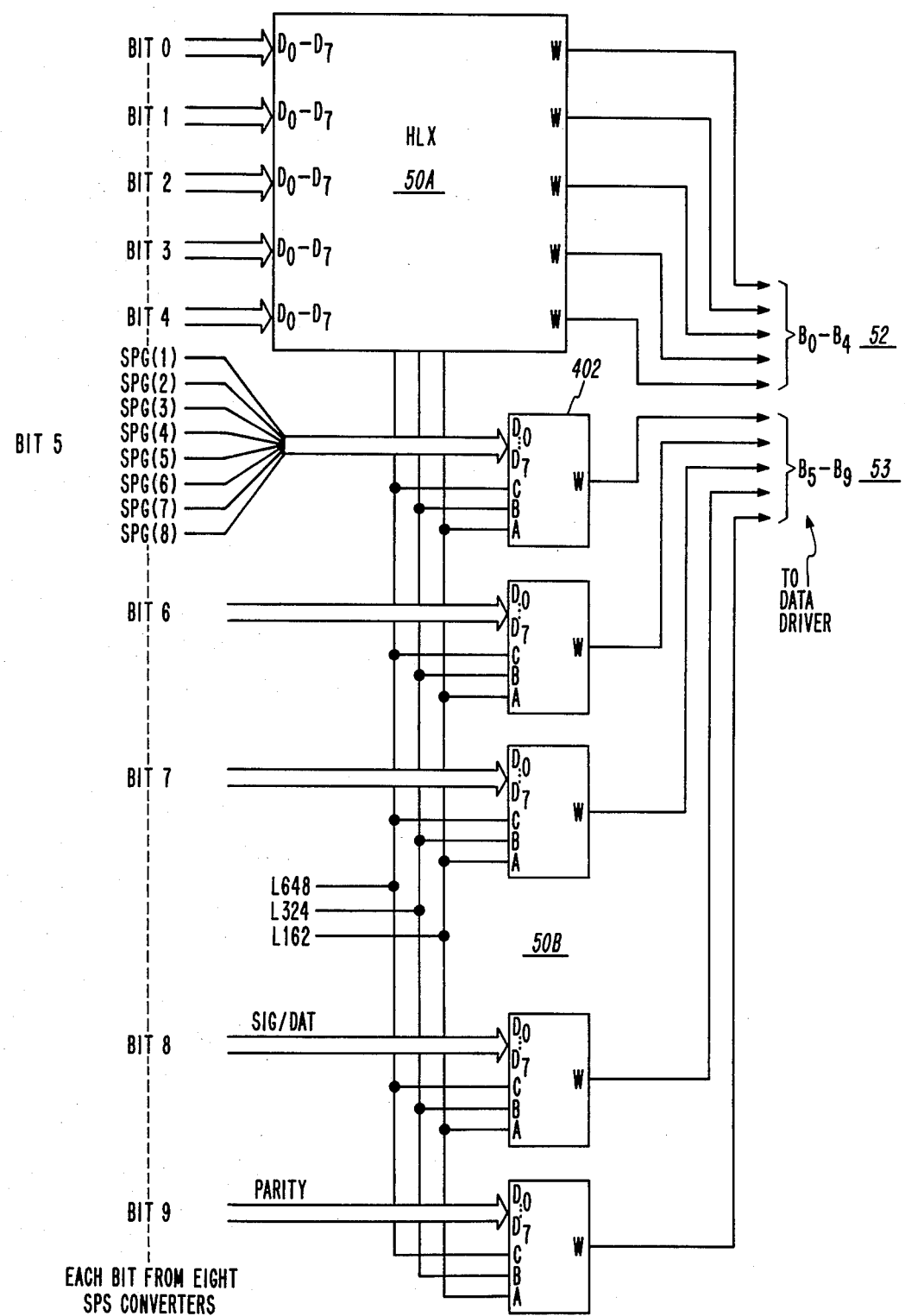
FIG. 4 is an electrical schematic drawing of the system high level multiplexer receiving eight parallel ninety-six channel TDM buses of PCM voice and data information and therefrom developing a single 768-channel bus.
Figure 5:
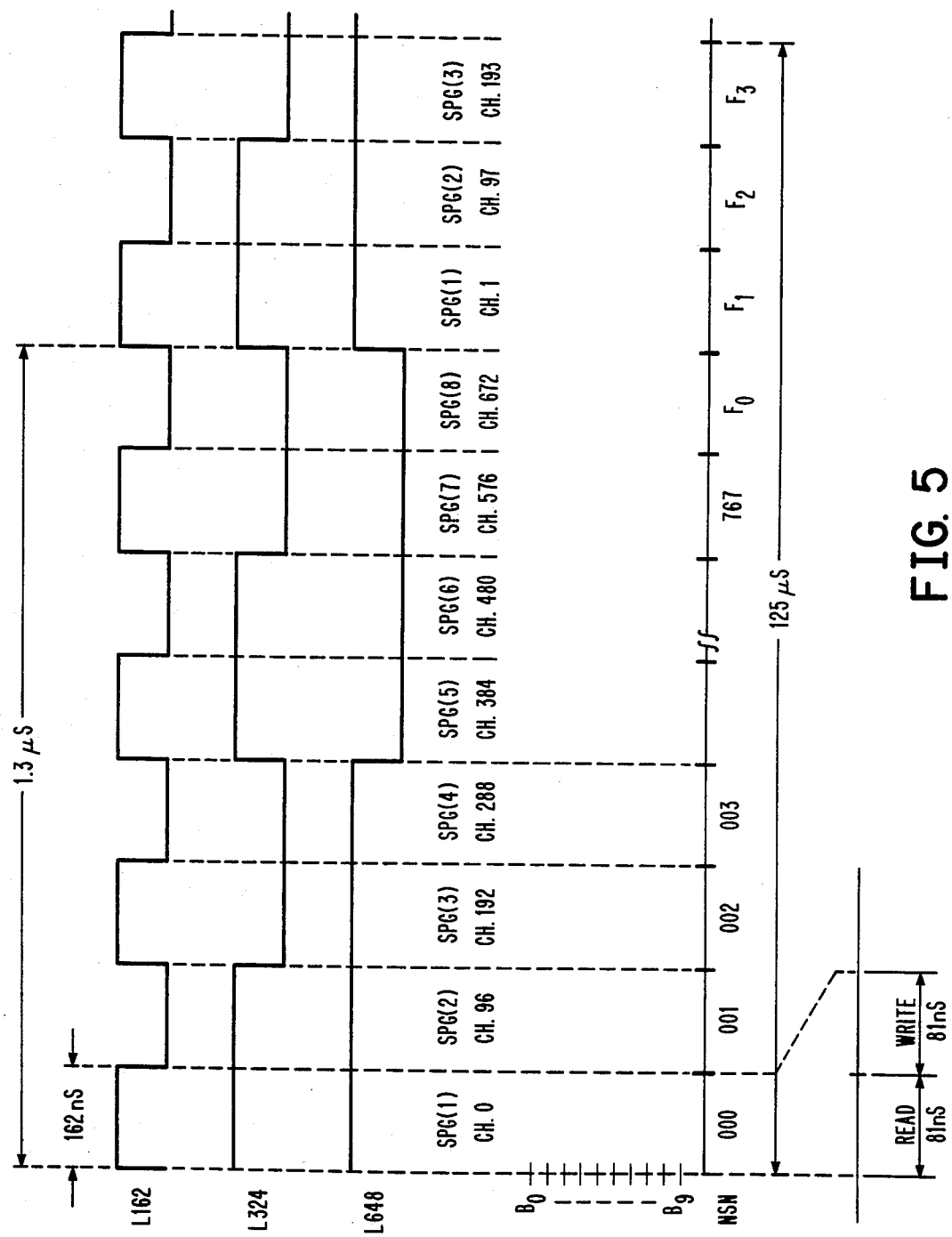
FIG. 5 illustrates, in timing chart form, the manner in which the high level multiplexer, of FIG. 4, divides the final 768-channel bus into channels, each identified by a network slot number, and the numerical association between the channels and the network slot numbers.

FIG. 4 highlights the connection aspect of the HLXs and indicates, along with the system clock timing intervals shown in FIG. 5, how each ten-bit word of each of the eight SP(X) converter output buses, all occurring in a 1300 nanosecond interval, are further reduced to eight parallel 10-bit words, each occurring in a 162 nanosecond network time slot interval. In FIG. 4 the high level multiplexer shown generally at 50 is physically made up of two multiplexers 50a, 50b each of which concentrate five bits of the 10-bit word from the eight preceding SP converters. Bit 5 is specifically expanded in the drawing to illustrate this facet.

The bit multiplexer integrated circuit 402 performs a selection function only on bit five of each 10-bit digital word. Such bit, as well as the other nine, originates out of both of the SPG(X) buses of each of the preceding SP converters. For the sake of brevity it should be noted generally that all other bits are similarly wired, but are not shown expanded in FIG. 4. The timing signals L162, L324, L648 appearing in the circuit of FIG. 4 and shown graphically in FIG. 5 control both HLX circuits 50a, 50b, to sequentially select one SPG(X) bus to form a composite 10-bit parallel word $B_0$–$B_9$.

With particular reference to FIG. 4, the operation of the bit multiplexers 50a, 50b will be better understood by considering a clock signal count advancing from (L648, L324, L162) = 111 to the binary state 000. The binary input clock state 111 causes the bit existing on the $D_0$ input of each bit multiplexer to be transferred to its output W. For the five bit multiplexers comprising HLX 50a the transferred word is $B_0$–$B_4$ of bus SPG(1), and the five bits of HLX 50b transferred are $B_5$–$B_9$ of bus SPG(1). Thus, in the first exemplary network slot the HLX 50 has selected the 10-bit word outputted by $SP_0$ on bus SPG(1) which word corresponds to the information at access port $VP_0$/$DP_0$.

Within the next network slot interval (when L162 changes from a logic high state to a low state—FIG. 5) the new clock state (110) causes a bit multiplexer transfer of information on input $D_1$ to the respective output W. In the instant example bits $B_0$–$B_9$ of bus SPG(2) are the subject of transfer. The word comprising these bits originated again from $SP_0$ but from bus SPG(2). This paritcular word corresponds to a sample taken from the first subscriber of the first line card in the second 96-channel group, to wit: $VP_{96}$/$DP_{96}$. In a similar manner, the first word of each of the remaining six 96-channel groups is extracted from buses SPG(3)–SPG(8) to fill out the remaining six network time slots and thus to fill the 1300 nanosecond interval (See FIG. 5). The corresponding access port identities are;

$VP_{192}$/$DP_{192}$
$VP_{288}$/$DP_{288}$
$VP_{384}$/$DP_{384}$
$VP_{480}$/$DP_{480}$
$VP_{576}$/$DP_{576}$
$VP_{672}$/$DP_{672}$

The foregoing cycle repetitively occurs with the subsequent ninety-five words of each of the eight 96-channel buses. It should be appreciated now that the product of 96 channels per bus, times 8 buses, times 162 nanoseconds per channel is substantially equal to the 125 microsecond interval in which the whole operation repeats using new voice samples and new data information bits.

FIG. 5 further illustrates the 125 microsecond system sampling interval in which one digital word from every input port is processed by the switching system. Each sampling interval additionally includes four framing intervals $F_0$–$F_3$ to accommodate the processing of T1 carrier framing information.

The information memory data driver 55 simply affords a means to drive the various network digital information memories 60 every 162 nanoseconds with a 10-bit word. It should be noted that the network memory contains at least 768 locations each being 10 bits wide to store the eight PCM voice bits, one bit of signal/data information and one bit of parity information. In accordance with an important feature of the present invention, the exchange of 10 bit digital words in the network information memories assures that PCM voice and data port information have the same origination and destination locations. It should also be remembered that the signal/data bit position (9th bit) accommodates, first voice port signalling information to communicate to the common control 31 which network connection to establish, and secondly, raw data port information to be switched between the originating data port and another data port through the established network connection.

The multiplexing bus and memory structure also allow simultaneous PCM voice switching capabilities insofar as there are a full additional eight bits allocated thereto. In this sense the illustrated network can be likened to a network having a PCM voice section and a signal/data section with identical addressing schemes. To satisfy different needs, or to effect a retrofit of structure to practice the principles of the present invention, one may desire that the signal/data network section be physically distinct from the PCM voice section. Moreover, there is no inherent necessity that the addressing schemes of the two sections be the same—aside from the desire to diect data and PCM voice information to the same destination port. In some instances it may be desirable to utilize separate signal/data and PCM voice networks or sections having independent addressing schemes whereby data and voice information originating from one port are switched to separate destinations. For example, one switching system subscriber having simultaneous voice and data options may call another person, inform him that he (the originator) is going to transmit data to a central processor located at a third location—and yet continue the voice communication.

While the details of switching PCM information by way of digital memories is well known to those skilled in the art, it will be noted here that the memory read and write cycle must occur in a 162 nanosecond network time slot period. This aspect is shown at the bottom of FIG. 5 wherein the read operation first occurs in the initial 81 nanosecond portion of the network slot number (NSN) to switch a previously stored TDM word, and the write operation then occurs in the last half of the NSN period wherein new TDM information is written for subsequent switching.

Having set forth the operational aspects of the exemplary 768 channel switching system in which PCM voice and digital data are carried throughout the system to the digital network, attention will now be focused on the return route of such information. However, rather than belabor the disclosure with details which, with the benefit of the foregoing description, would be apparent to the reader, only those areas which depart from the apparent will be highlighted.

RECEIVE BUS ARCHITECTURE

Parallel to Serial Converter

Figure 6:
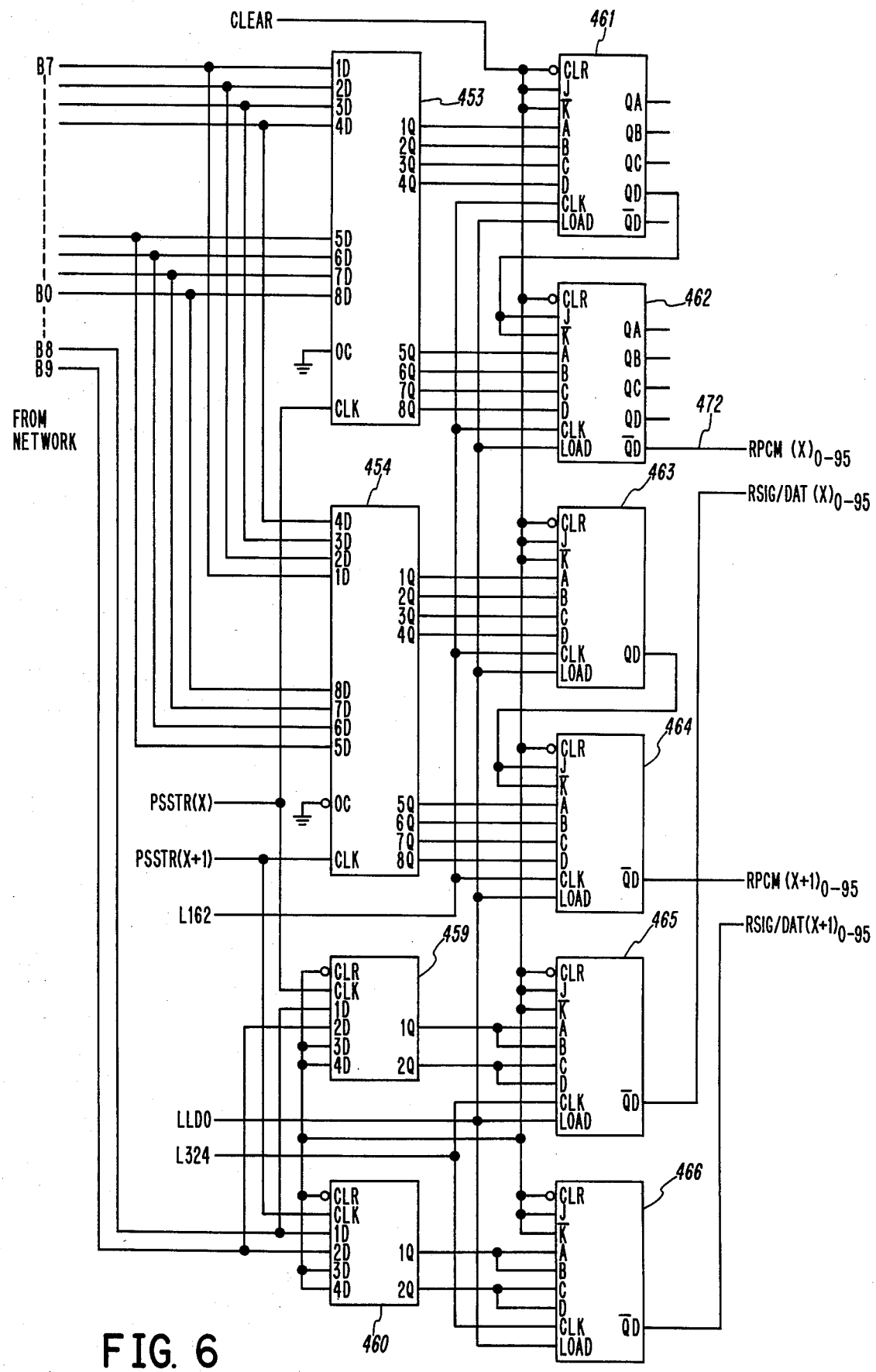
FIG. 6 is an electrical schematic drawing of the parallel to serial converter receiving 10-bit parallel 768-channel PCM voice and data information, and converting the same into two 96-channel serial buses.

Returning to FIG. 1, and specifically to the digital network 60, it will be noted that a single 768 channnel parallel 10-bit bus emanates from the network 60. This bus is fanned out to provide a 768 channel 10-bit input to all four parallel to serial (PS) converters. FIG. 6 illustrates the serialization of the 10-bit parallel information before being transferred to the respective low level multiplexers.

The switched 10-bit words, labelled again as $B_0-B_9$, appear at the left-hand side of FIG. 6. It will be recalled that each PS converter handles two particular 96-channel buses of information, yet all 768 channels are coupled to the return input of each parallel to serial (PS) converter. Thus, when those TDM channels uniquely associated with each PS converter appear on the $B_0-B_9$ leads, that word is strobed into the latches 453, 459 by way of a parallel to serial strobe pulse PSSTR(X). The "X" indicates the strobe is appropriately timed to pick off TDM information pertaining to the Xth group of 96 channels. In a similar fashion, PSSTR(X+1) strobes TDM words into latches 454 and 460. There are eight such different strobes, two for each of the four PS converters. About 1300 nanoseconds are consumed in loading the two pairs of latches just described and the six similar pairs for the other 96-channel buses.

Shortly after the TDM word is latched into latches 453, 454, 459 and 460, but before the next 1300 nanosecond interval, the TDM word is tranferred to a set of parallel-in serial-out registers for serialization. The registers associated with latch 453 are comprised of a pair of 4-bit registers 461, 462 having the $Q_D$ output of register 461 coupled to the J and $\overline{K}$ inputs of the register 462. Registers 463, 464 associated with the latch 454 are similarly arranged. The register 465 is associated with the latch 459 for receiving the signal/data and parity bits for the first channel whereas the register 466 serves the same function for the second 96-channels. Since there are only two bits clocked out of the registers 465, 466 and each is sent twice, the A and B inputs are tied together—as are the C and D inputs.

The data from the respective latches is loaded into their associated registers 465, 466, as is the information on the other serial converters, under control of the load data outgoing pulse LLDO. The data information is then clocked out of the registers, and in the case of bits $B_0-B_7$, at 162 nanosecond intervals under control of the system timing pulse L162. Similarly, the signal/data and parity bits ($B_8-B_9$) are clocked out at a 324 nanosecond rate by the L324 system timing pulse.

Referring now to the registers 461, 462, the serial data appearing on the output line 472, which is connected to the low level multiplexer $30_0$, couples the 96-channel PCM voice words thereto in a seriatim fashion. In like manner, the associated signal/data and parity information appearing on the separate bus $RSIG/DAT(x)_{0-95}$ is coupled to the mentioned $LLX_0$. The next 96-channel serial bus (x=1), as well as all the other PS receive buses, are similarly connected to another LLXs. At the end of each 1300 nanosecond interval, all six serial converters are cleared by the CLEAR pulse.

It is relevant to note that the PCM voice words are yet associated, in a timewise manner, with the signal/data bits but appear now on different buses.

RECEIVE BUS—LLX OPERATION

The general aim of the low level multiplexers in the exemplary 768-channel switching system is to receive a single 96-channel serial bus from the PS converter and demultiplex it into four 24-channel parallel PCM buses for distribution to a respective group of four digital to analog converters. It should be noticed that at the LLX level the parity information finds a destination. To that end, parity is checked (not shown) and the corresponding duplicated bit positions a left vacant when forwarded to the ADA circuits.

Figure 7:
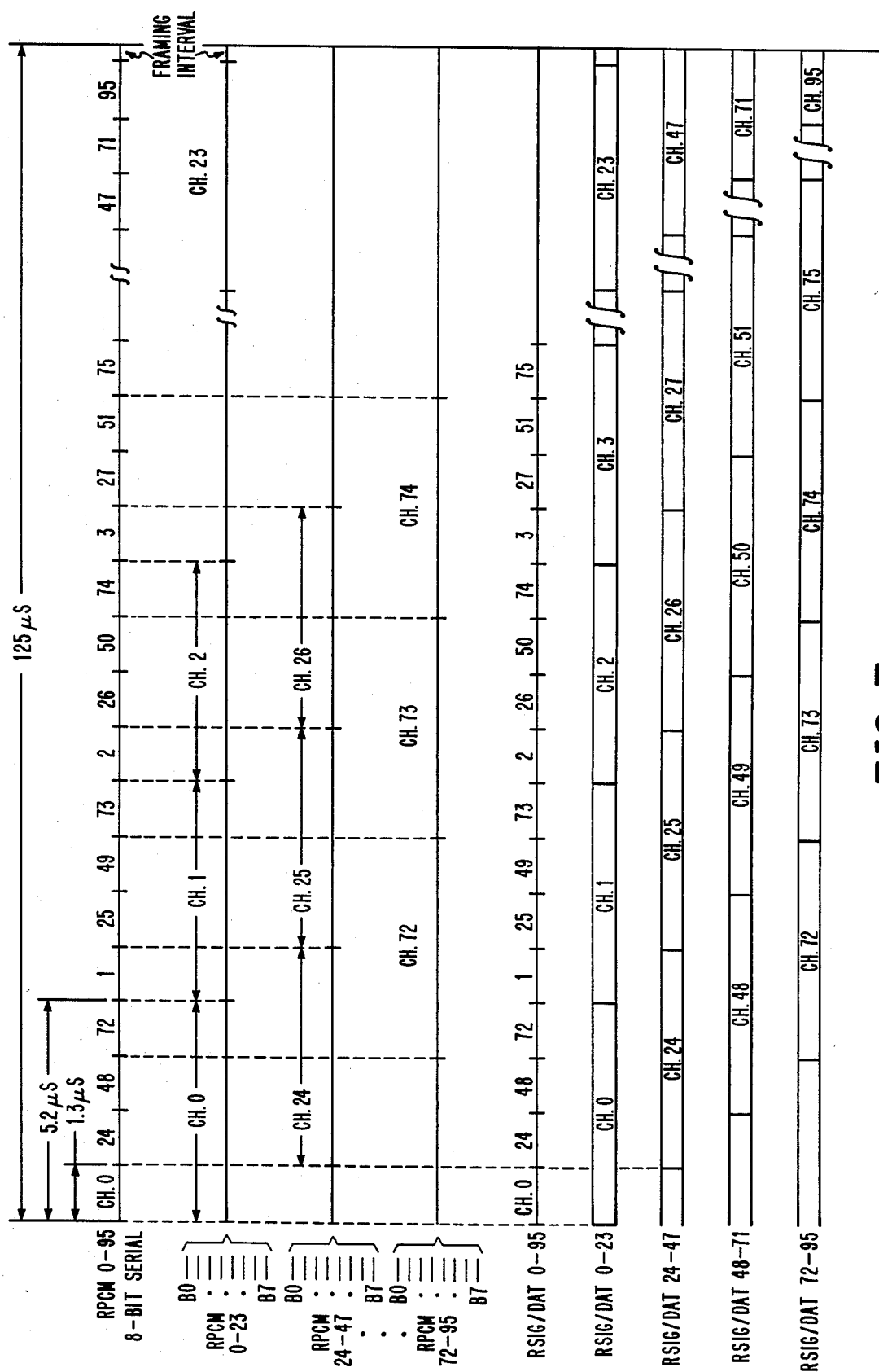
FIG. 7 is a timing diagram illustrating the operative low level multiplexer steps in accepting 96-channel serial PCM voice and data information from the parallel-to-serial converter and generating four receive buses of twenty-four channel information for delivery to an associated four digital-to-analog converters.

The details of the LLX demultiplexing are not illustrated in electrical schematic form as it is well within the ambit of those skilled in the art to devise of appropriate circuitry such that one serial 96-channel bus is expanded into four 24-channel parallel groups in accordance with the waveforms of FIG. 7. As noted in the mentioned figure, the ninety-six channels of serial 8-bit PCM voice words are demultiplexed into four separate 8-wire buses extended to the four 24-channel digital to analog converters. Each of the wires is dedicated to one bit of the 8-bit PCM voice word. Also, each wire corresponding to a bit is time-divided into twenty-four recurring partitions to carry the bit information for the 24 channels (voice ports) serviced by the assoiated ADA. FIG. 7 illustrates this demultiplexing principle by noting at the left-hand side thereof that the 8-wire RPCM 0–23 bus derives its information from every fourth channel of the RPCM 0–95 serial bus. In essence, the eight bits of serial information occupying 1.3 microseconds on the RPCM 0–95 bus are distributed, one bit to a wire, on the parallel RPCM 0–23 having a 5.2 us interval of time.

The second set, as well as the third and fourth, of "every other fourth time slot" on the serial RPCM 0–23 bus are similarly redistributed to the other parallel buses RPCM 0–23 RPCM 24–47 RPCM 48–71 and RPCM 72–95, which in turn are directed to three respective ADAs. It should be noted that because the channel spacings on the serial bus RPCM 0–95 are 1.3 microseconds, the channel slots between adjacent ADA converters are also staggered 1.3 microseconds. As illustrated at the bottom of FIG. 7, the corresponding serial RSIG/-DAT 0–95 bus is broken down into four single-wire buses each having twenty-four time channels of data information. Each 24-channel RSIG/DAT bus is directed toward one of the four ADA converters servicing one fourth of the group of ninety-six access ports. Worthy of note is the fact that each RSIG/DAT channel is aligned with its partner PCM voice channel although separated in a spacewise manner by virture of the physically distinct nature of the two buses.

Referring briefly to FIG. 1, the RSIG/DAT bus is shown with a dotted line extending through the ADA$_0$ converter. Such a dotted line indicates that the data information passes essentially unpeded through the converter—with the possible exception of again being buffered, delayed or inverted. The final distribution of the serial 24-channel data information at the line card level will be described in detail in the following section which addresses the data port interface associated with each voice port.

With the details of the signal/data transmit and receive bus structure in mind it should be realized that such an architecture provides a great deal of flexibility in permitting any one voice/data port pair to communicate with any other voice/data port pair. It should, however, be equally realized that since data information is not generally "processed" by a switching system, but rather used only as a medium to transfer the raw data bits, such data is usable at any point in the system in which it may be extracted. In contrast, PCM voice information to be usable as voice signals must be "processed" (i.e. converted) from the digital form into the analog form. Thus, data information transferred on the signal/data buses need not necessarily find a destination back to another data port. Indeed, data information could be inserted, for instance, at the network level, into the appropriate time slot, to be carried on a TDM bus only away from the network. Conversely, data information may be extracted at the network level to be carried to a dedicated destination.

By way of example, assume that a majority of subscribers only need data transmit capabilities to a single master data processor. The high level multiplex receive bus need only then be cross-connected to lines connected to such processor and upon dialing a certain number each such subscriber may achieve essentially a one-way data connection through the system. The data processor would, however, have to correlate the various data time slots with the various data destinations.

Thus, it is seen from the foregoing how the described bus architecture allows a conjugation of the PCM voice information and data information which, when routed throughout the switching system, provides a way to simultaneously switch voice and data information. Moreover, the "piggy backing" of the parallel data time slot with the voice time slot, and the 10-bit information memory permits an automatic network connection for data to be made when a voice connection is established. It should be borne in mind that while a dedicated data channel is provided for each data port, this channel is used, at a different time, for transferring voice port signalling information, such as dial pulses, to a dial pulse register 15 via a network connection.

It should be recognized that there is no intrinsic need to extend signalling information back to the line card level as such information is processed only by the common control 31 and is thereby consumed or terminated when received by the appropriate registers. To that end the described 768-channel (e.g. access port) system, in its practical application, does not allocate all of the TDM time slots to subscriber channels but rather dedicates a number of time slots to ancillary equipment such as digital tone generators, DTMF receivers and dial pulse registers. Such dedicated time slots insure that, irrespective of the busy status of the system, there are always TDM network channels available to provide the necessary connections to the noted equipment. Of course, having dedicated a portion of the exemplary 768 channels to system equipment use, the full complement of 768 channels is not available for subscriber use.

A network signalling connection is to be distinguished from a data connection insofar as a data path extends from one data port to another while a signalling path extends from the voice port, through the network, and back to the ADA level where a DTMF or dial pulse register is connected. Therefore, to provide full data switching capabilities, a receive data bus (RDATA) must be extended from the ADA level to the data port interface circuitry, certain embodiments of which will be discussed in detail below.

While the preceding description assumes the availability of data information on the transmit bus TSIG/-DAT, it will be left to the remaining portion of this description to describe the manner in which a synchronous data may be conviently switched through the system by implementing data port interfaces in the line cards. In addition, and in view that the TDM isochronal rate is 8 Khz, 8 kbs data information present at the data port may be switched through the exemplary system, when synchronized at the data terminal end or internally with the system basic clock. Moreover, and in accordance with principal objects of the invention, various methods and apparatus will be described where bit rates in excess of 8 Kbs may be accommodated by the illustrated switching system. It is a further specific purpose of the invention, to be described hereinafter, to provide the communication system with the capability to switch asynchronous data information at the commonly used bit rate of 9.6 Kbs.

DETAILED DESCRIPTION OF THE LINE CARD

Figure 8:
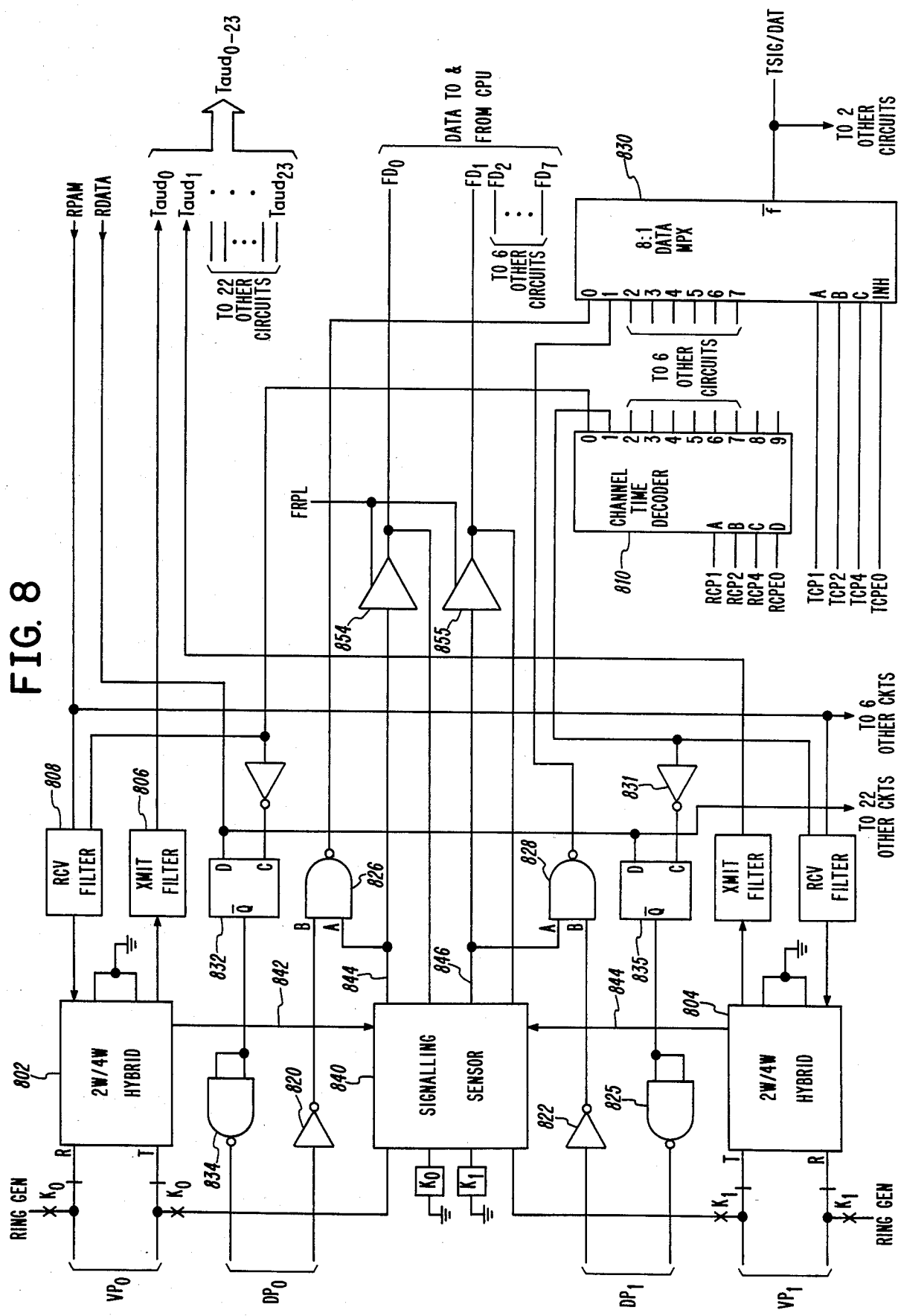
FIG. 8 is an electrical schematic diagram illustrating one embodiment for interfacing low speed data transmitted to a data port with that port's data channel time slot.

Turning now to FIG. 8 there are shown parts of the line card $10_0$ disclosed in FIG. 1 in block form. In the practical realization of the line cards, there are eight such voice and data ports per physical printed circuit line card. Three such cards accommodate twenty-four PCM channel time slots. There is specifically shown a 2-wire/4-wire hybrid converter 802 which converts the bidirectional voice port $VP_0$ information into unidirectional receive and transmit information. Voice information arriving at the hybrid 802 by way of the subscriber line is passed through a four kilohertz bandpass transmit filter 806 and is transferred to the ADA converter $20_0$ (FIG. 1) on one wire of the twenty-four wire bus $Taud_{0-23}$.

verter $20_0$ on the serial bus RPAM is directed to the receive filter 808 and to twenty-three other similar filters, twenty-two of which are not shown.

Since the twenty-four serial PCM words are presented to each receive filter, there is provided a gating means 810 which sequentialy enables the respective filters when "channel time" appears. "Channel time" is informally defined here to mean that time when the PCM time slot associated with that port exists on the bus. The BCD-to-decimal decoder 810 decodes the binary count represented by leads RCP1—RCP4 and RCPEO, to give an output indication when one of twenty-four particular TDM channels (i.e. channel time) occur. RCPEO is an enable signal which is active during one third of the 125 microsecond frame interval to enable the receive filters corresponding to PCM channels 0–7. Two other enable signals (not shown) provide similar functions to activate the two remaining sets of eight PCM channels so that all twenty-four PCM channels find their dedicated voice port destination. Noting that the preferred embodiment utilizes one dedicated PCM channel per voice port it is significant that the particar receive filter 808 should be synchronized with the channel-0 PCM word occurring on the RPAM bus such that the word is captured and transmitted through the hybrid $80_2$ to $VP_0$. The line cards, each having eight voice ports per card, share one such channel time decoder 810.

Having briefly discussed the transfer of voice information, attention will now be directed to FIG. 8 in connection with transferal of signal and data information. Data information externally received by the illustrative system through data ports $DP_{0-1}$ is converted from transmission line amplitude voltages to the standard 5-volt logic by way of inverters 820 and 822. Assuming for the moment that input A of NAND gates 826, 828 is at a logic high, the data information is transferred through the gates to the corresponding inputs of the 8:1 data multiplexer 830.

The data multiplexer 830 serializes any data information present on its eight inputs onto the serial TSIG/-DAT bus. The timing of this serialization is accomplished by clocking the multiplexer 830 with transmit channel binary pulses $TCP_1$-$TCP_4$. The transmit channel pulse enable TCPEO, similar in operation to the RCPEO signal, allows the 8:1 multiplexer 830 inputs to be properly distributed on the 24-channel TSIG/DAT bus. This serial bus is wire-OR'ed to two other circuits (not shown) so that data information may be inserted into the other 16 (of the 24) channels of the bus. With the foregoing in mind, it should be realized that each of the twenty-four data ports are "sampled" for one twenty-fourth of 125 microseconds (5.2 us), and the logic level then present at the respective data port, is inserted on the TSIG/DAT bus. Thus, any data information having a stable logic level of 125 microseconds duration or greater, is captured by the multiplexer 830 and switched by the system in accordance with the major description preceding this section.

It may thus be concluded that the foregoing illustrated embodiment is capable of switching asynchronous uniform duty cycle data with transmission rates of 4 Kbs or less (logic levels of 250 us or greater).

Assuming now, for illustrative purposes that data port $DP_1$ represents the destination of switched data information, it is seen that data is serially transferred to the line card on serial bus RDATA, and is particularly available at data latches 832, 835 and twenty-two other data latches (not shown). FIG. 8 illustrates the data latch 835 which picks channel-1 data bits off the bus in accordance with the channel timing pulses of decoder 810 previously described in connection with receive filter channel time decoding. The clocking leads RCP of the decoder 810 perform a similar function as the TCP leads by sequentially enabling the receive circuitry of each of the eight voice and associated data ports.

At "channel time", data information is extracted from the serial Rdata bus and clocked into the D-type latch 835. The clocking pulse indicating "channel time" is inverted by gate 831 and effects the storage of channel-1 data information in the latch 835. Data information is coupled from the storage element 835 to the data port $DP_1$ transmit line by way of logic gate 825. This gate performs the inverse functn of inverter 820 by converting 5-volt logic levels into EIA-compatible line voltages.

It was noted previously that the data bit slot may be utilized to communicate signalling information present at a voice port, through the network to ancillary equipment such as a dial pulse receiver. The communication of signalling information within the switching system necessarily transpires before a network voice connection has been established and thus before voice or data information is available at the respective ports. On-hook, off-hook, hook flash and rotary dial pulse information appearing on the bidirectional voice port lines is transmitted through the hybrids 802, 804 to a signalling sensor 840 by way of leads 842, 844. The signalling sensor 840 provides access to such information at its output lines 844 and 846. Particularly, off-hook and on-hook indications are characterized by, for example, logic high and low states respectively at such output lines. And even more particularly, once a subscriber set goes off-hook and dials by way of a rotary telephone set, the dial pulses appear as momentary on-hook states. The common control is able, however, to make a distinction therebetween based upon the time intervals involved.

Subscriber line requests for service (off-hook indications) information on the leads $FD_{0-1}$ is made accessible to the common control 31 by way of the tristate drivers 854, 855. When enabled by the FRPL pulse, the tristate drivers 854, 855 also form an interface between the switching system common control 31 and the signalling sensor 840. At recurring intervals of time the common control interrogates the FD leads to determine if requests for service are present, and on a positive indication thereof, the common control establishes a network connection between the signal sensor 840 and a dial pulse register to receive expected dial pulses.

The TSIG/DAT bus advantageously accommodates signalling information by providing a communication channel for the transfer of dial pulses to a receiving register. The common control analyzes the dial pulses and establishes a voice and data connection in response thereto. The A input of gates 826, 828 allows dial pulses from the signalling sensor 840 to be multiplexed onto the TSIG/DAT bus by the previously described 8:1 data multiplexer 830. As previously noted, dial pulse information is communicated to the switching system prior to data information and, that being the case, input B of gates 826, 828 is inactive (logic high) thereby allowing the signal information to pass freely therethrough on input A.

As a consequence of directing signalling information toward the switching system for processing, the common control 31 in response thereto, may transfer messages to the signalling sensor 840 by way of the bidirectional $FD_{0-1}$ leads. Interface buffer gates 854, 855 will naturally be put into the high impedance states by way of lead FRPL to facilitate a message flow toward the sensor. In response to common control messages, the signalling sensor 840 may, for example, operate either relay $K_0$ or $K_1$ to apply ringing current to the voice port leads $VP_{0,1}$ by way of the $K_0$, $K_1$ relay contacts.

From the foregoing it is seen that the integration of data information switching capabilities to the illustrated switching system does not restrict the normal use of the voice ports. Moreover, voice information appearing at the voice port $VP_0$ may be freely switched through the network connection established in response to dial pulse information. Thus, in keeping with important aspects of the invention, it is seen from FIG. 8 that eight bits of voice PCM information may be transmitted to the system by way of the $Taud_{0-23}$ leads and received from the network 60 by way of the RPAM bus as PAM information. In accordance with known methods, the receive filter 808 converts the 125 us recurring PAM signals into an analog waveform corresponding to the transmitted voice waveform. In time synchronism with transmit and receive PCM voice words, one bit of data information per data port may be transmitted to the network 60 by way of the TSIG/DAT bus, switched through the same network connection, and received by the destination data port by way of the RDATA bus.

8 Kbs DATA PORT INTERFACE EMBODIMENT

Further advantages of the invention may be realized when data information bits are injected on the TSIG/DAT bus in synchronism with the basic switching system 8 KHz rate. In this instance, the Nyquist frequency no longer needs to be satisfied and thus data information may be switched at the 8 KHz rate. This transmission rate, and the involved apparatus to be described, easily accommodate the popular 7200 baud rate in current use today.

Figure 9:
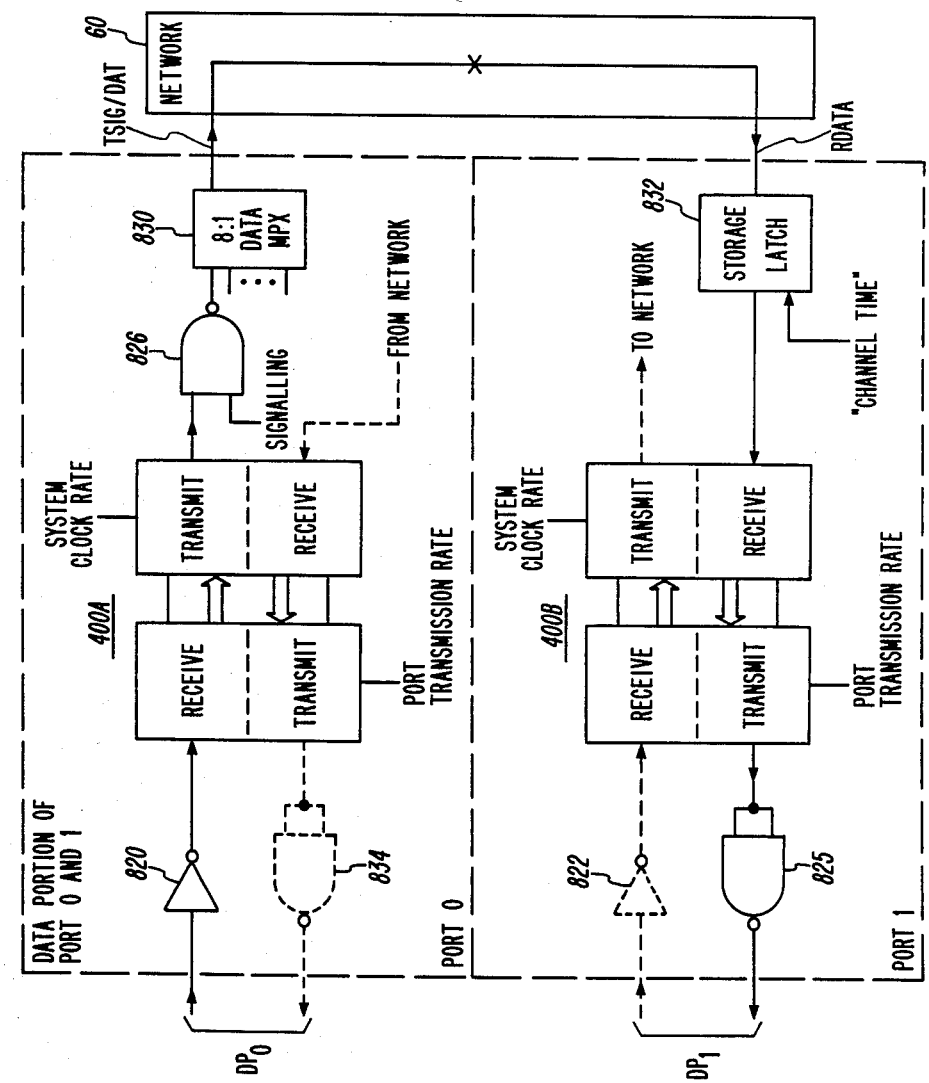
FIG. 9 is a detailed block diagram of apparatus which synchronizes asynchronous data information with the switching system clock rate to accommodate an external data transmission rate in excess of four kilobits per second.

It should now be realized that, for every data port, a data bit time slot is available every 125 microseconds, i.e. an 8 KHz rate. Thus, in order to switch 8 Kbs data (kilobits per second) it is necessary to always make data information available as the channel data time slot arrives. FIG. 9 illustrates a method of accumulating asynchronous data received by the data port $DP_0$, and synchronizing the data with the system clock (and thus with the desired channel data slot).

For illustrative purposes it will be assumed that transmitted data at port $DP_0$ is switched through the network 60 pursuant to a destination set up in accordance with voice port signalling, and then received by the destination data port $DP_1$. Again, the logic gates 820 and 825 interface the 5-volt logic and the transmission line voltages. The interface gate 834 associated with synchronizer 400a, and the interface gate 822 associated with synchronizer 400b are not active in the instant example and are thus shown as dotted lines to avoid confusion as to the direction of data flow.

Data synchronizer 400a (FIG. 9) accumulates serial data in synchronism with the external transmission rate of, for instance 7200 bps. In the instant example the format of received data corresponds to one standard EIA format having eight data bits in addition to a start and stop bit. It should be understood however, that the utility of the present invention is not limited to the exemplary transmission format but rather the principles of the present invention are equally applicable to other conventional serial data formats. The synchronizer 400a is comprised of two major sections one of which is associated with the data port side of the switching system to receive and transmit formatted serial data words to a remote data terminal device. Such a section receives and transmits data information at the external rate which, in the instant example, is 7200 bps. The other section is associated with the network side of the switching system which section transmits and receives formatted serial data words to and from the digital network at the basic system clock rate of 8000 hertz.

The two sections of the data synchronizer operate independently of each other by virtue of their separate and different clock rates but are yet interconnected so as to signal each other when to start a transfer of data from the receive portion of one section to the transmit portion of the other section. This asynchronous "handshake" which occurs between the sections allows one data transmission rate to be changed to another rate. One limitation to this embodiment is that the external data transmission rate must be equal to or less than the system clock rate.

The data words, accumulated in the network-associated section are then serially transmitted, toward the network 60 at the system clock rate. Logic gate 826 again provides a means in which either signalling information or data information may be multiplexed into the data channel time slot. It should be remembered that an off-hook condition maintains the "signalling" lead of gate 826 in a logic high state.

After having been switched through the digital network 60 by way of the information memory signal/data bit location, as hereinbefore described, the data bit information is extracted at "channel time", temporarily stored in latch 832, and thereafter clocked into the destination data port synchronizer 400b at the system clock rate. It should be noted that the exemplary data word transmitted through the network 60 is comprised of the original eight serial bits of data information in addition to start and stop bits. Data information is accumulated in the destination port data synchronizer 400b at the switching system clock rate, and thereafter transmitted to data port $DP_1$ at the external transmission rate.

Figure 10:
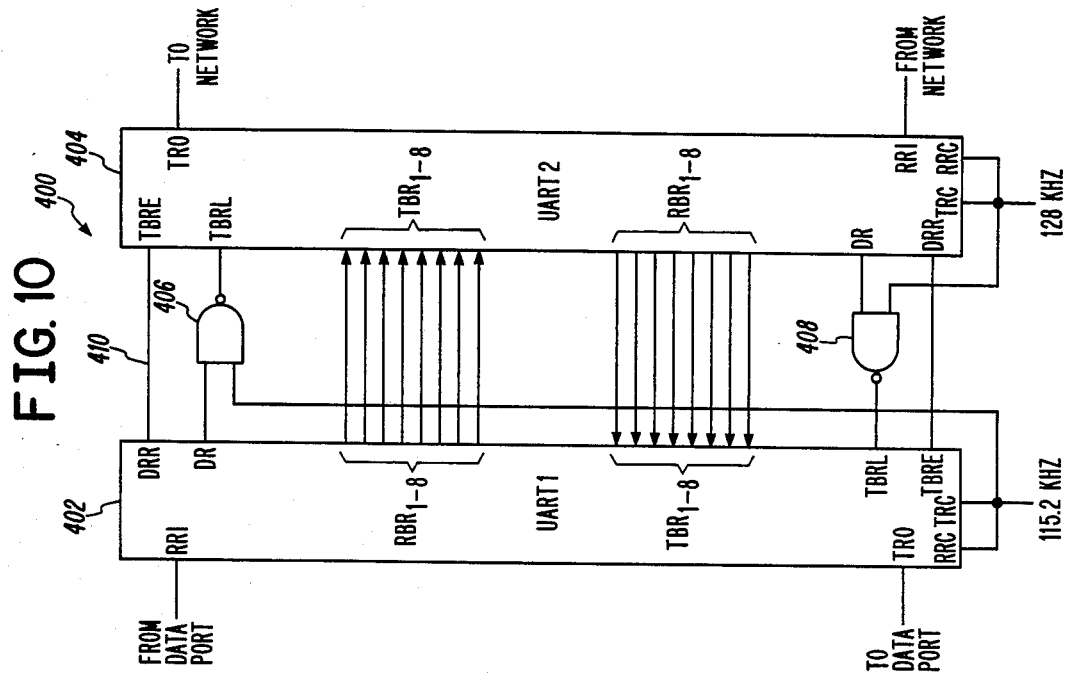
FIG. 10 is a detailed electrical schematic illustrating the interconnection of a pair of Universal Asynchronous Receiver Transmitters used to synchronize asynchronous data with the switching system.

FIG. 10 illustrates a particular embodiment of an "elastic" data buffer which is capable of synchronizing asynchronous data with the switching system data channel time slot. It should be pointed out that one data synchronizer 400 as shown in FIG. 10, is equivalent to each element 400a and 400b of FIG. 9. While the data synchronizers 400a and 400b are identical, in the discussion of the data synchronizer 400 of FIG. 10 it will be assumed that the synchronizer 400 will receive switched data when discussed in terms of the synchronizer of 400b also of FIG. 9. However, for the reason that each data port is capable of transmitting or receiving data i.e. half duplex, each data synchronizer 400a, 400b is also capable of transmitting or receiving data with its respective data port.

Each data synchronizer 400 is comprised of a pair of Universal Asynchronous Receiver Transmitter devices (UART) such as the Harris HD-6402 devices. In accordance with the published specifications of such a device, the clock terminals RRC and TRC must be operated at a rate sixteen times the anticipated data transmission rate. Thus, UART1 402 being on the data port side is clocked at a rate 16 times the 7200 bps rate, or 115.2 Khz. Conversely, UART2 404 being on the system side is clocked at a rate 16 times the 8 Khz sampling rate, or 128 Khz. Such clock rates are not required to be multiples or to be synchronized by way of phase lock loop principles.

Serially transmitted data arriving at data port $DP_0$ is accompanied with start and stop bits so that receiving apparatus is able to distinguish between the concatenation of serial words. In the example, UART1 402 receives serial words each of which include a first start bit, at least one ending stop bit, and eight data bits therebetween, all at a 7200 bps rate. This 10-bit data word is assembled into a parallel word by UART1 402 and transferred, in parallel, to UART2 404 stripped of the original start and stop bits. In view of the fact that the converted parallel words are easily distinguishable, one from the other, there is no intrinsic need to append start or stop bits.

UART2 404 receives the stripped parallel 8-bit word and generates a serial 10-bit word for transmission toward the network 60 at the system rate. An asynchronous signalling between the UARTs by way of gate 406 and circuit connection 410, as will be discussed, prevents potential loss of data words transferred between UARTS due to their independent operation. The new 10-bit serial word is thus comprised in part of new start and stop bits reinserted by UART 404.

As concerns the exemplary switching of data from data port $DP_0$ to port $DP_1$, UART1 402 and UART2 404, embodied in the data synchronizer 400a, will receive data at a 7200 bps rate and transmit to the network 60 at an 8000 bps rate. However, as embodied in the data synchronizer 400b, UART1 402 and UART2 404 will receive data at the system rate (8000 bps) and transmit to a destination terminal device at a 7200 bps rate.

Data information transmitted from a terminal device to the exemplary switching system is received by UART1 402 on its RRI input. During this time the DR lead is at a logic low to inhibit a 115.2 Khz clock transition from activating the TBRL input of UART2 404 to thereby prevent entering of unstable information which may be present on its parallel inputs $TBR_{1-8}$.

After a complete serial word has been assembled into a stripped parallel 8-bit word by UART1 402, it becomes available at the output receive buffer register leads $RBR_{1-8}$. It should be noted that the transmit and receive portion of each UART typically operate autonomously. Therefore, when UART2 404 becomes ready to receive the assembled parallel 8-bit word, lead 410 is driven high by TBRE thereby forcing the UART1 402 DRR terminal high. This logic high, along with an internal indication that a complete 8-bit word is present on RBR leads, causes terminal DR to go high thereby enabling gate 406 to transfer the 8-bit parallel data word into UART2 404 via the $RBR_{1-8}/TBR_{1-8}$ leads. It is to be remembered that the transfer of data between UARTs is occasioned in the absence of format start and stop bits.

The intercommunication signalling between the DR/TBRL and TBRE/DRR terminals thus provide a "handshake" between the UARTs whereby data transmission between the UARTs is prohibited until an entire parallel word is available and the receiving UART is ready to receive such word. This aspect assures that all data is preserved and none is lost due to the asynchronous operation of the UARTs. Internally, UART2 404 assembles the parallel 8-bit word into a serial word having new start and stop format bits which word is then retransmitted to the digital network 60 at the system clock rate of 8 Khz.

The storage latch 832 of FIG. 9 is clocked at "channel time" to extract the data information bit from the respective RDATA bus time slot associated with the respective data port. The serial data bits comprising the data word are asynchronously received by UART2 404 and assembled again into a parallel 8-bit word. It should be understood tht the RRC,TRC terminals of each UART are clocked at such a rate to establish a predetermined bit rate. UART1 402, as utilized in the illustrated embodiment, is similarly capable of receiving parallel data from UART2 404 in an asynchronous manner.

There is a similar handshake between the UARTs to effect a transfer of parallel data from UART2 404 to UART1 402. UART1 402 assembles the stripped parallel 8-bit word into a serial 10-bit word, including other start and stop bits, for subsequent retransmission to data port $DP_1$ at the external transmission rate.

It is thus seen that the pair of UARTs, clocked at different rates, and interconnected to communicate between themselves asynchronously, provide an elastic buffer capable of changing data rates and synchronizing one input data rate with the different switching system time slot rate.

9600 bps DATA PORT INTERFACE EMBODIMENT

Figure 11:
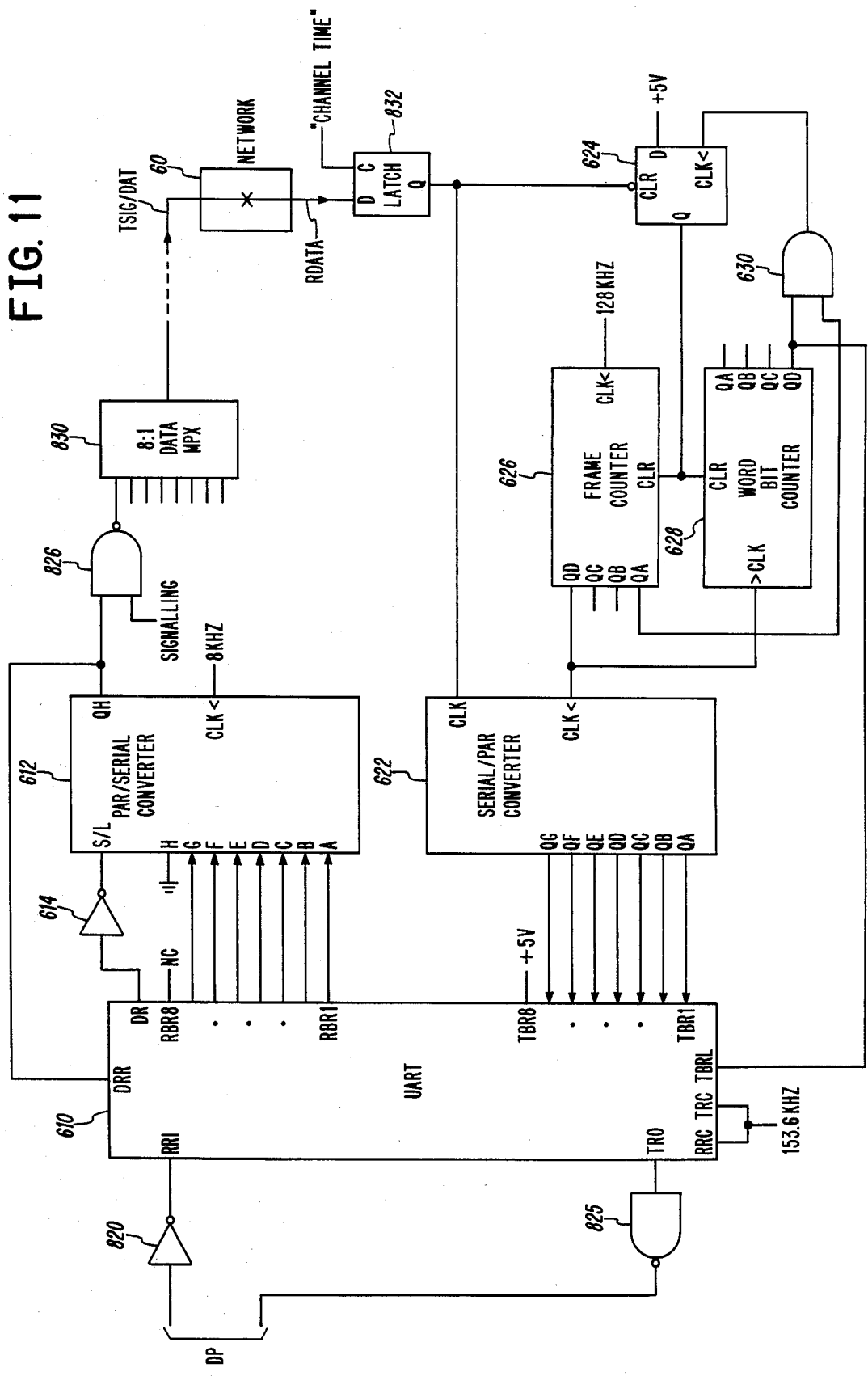
FIG. 11 is a detailed electrical drawing illustrating apparatus for synchronizing standard EIA data information having data rates in excess of the system 8 Khz clock rate.

In keeping with the primary aspects of the present invention, there is shown in FIG. 11 a data channel interface suitable for coupling 9600 bps EIA data information to the illustrated switching system data channels. It is recognized that an EIA transmission format may also characterize a data word in the form of, for example, 1 start bit, 2 stop bits, and 7 data bits. The data channel interface, to be discussed in detail, takes advantage of the additional transmitted bits that do not form a part of the data information, by suppressing the same and utilizing the additional time segments for transmitting therein data information of another data word.

It should be understood that of the ten EA formatted data bits transmitted, only seven are representative of the data information. Therefore, approximately 25% of the 10-bit data word is overhead comprised of format bits nonrepresentative of data information.

With reference now to FIG. 11 there is shown an electrical circuit capable of switching Rsynchronous format 9600 bps EIA-type data words through the exemplary system at an 8 Khz rate. The illustrated embodiment of FIG. 11 utilizes a single UART 610 to convert a 10-bit serial data word into a 7-bit parallel word, justified toward the RBR1 digit. When such a parallel data word has been arranged by the UART 610, the data ready (DR) terminal is driven high to prepare a parallel to serial converter 612, via gate 614, to load the assembled data word. The parallel word loaded by converter 612 is, however, eight bits wide. The converter 612, being clocked at a 8 Khz rate, then begins to transmit the loaded 8-bit data word serially toward the network 60 via the intermediate multiplexer 830 as previously discussed. The first data bit clocked out of the parallel to serial converter 612 corresponds to the data information present on input H, which is shown to be grounded.

Thus, the first data bit (start bit) of the now 8-bit data word, is always a logic zero and is specifically used for alerting receiving circuitry of an imminent data word.

It must be realized that because of the diverse bit rates involved, not all TDM time slots associated with instant data ports will be filled with data bits. There will, however, be some vacant slots between the illustrated 8-bit serial words. For reasons to be described later, these vacant time slots are filled with bits distinguishable from the logic state of the leading start bit of the new 8-bit word. To this end, when PS converter 612 is not transmitting serial words by reason of its S/L control terminal the output $Q_H$ is forced to a logic low state which, through gate 826, imposes logic one bits into the vacant time slots. As noted, these "filler" bits are distinguishable from the leading logic zero bit.

To simplify the drawings and the discussion thereof, FIG. 11 shows apparatus associated with a single data port. It should be understood that the same data port as shown in FIG. 11 will not be utilized in simultaneously transmitting and receiving data information. However, for the purposes stated, it will be assumed that the network 60 has switched the data information to a similar data interface structure associated with another data port.

The bits of the aforementioned switched 8-bit data word are generally received by the serial to parallel converter 622 after having been extracted at "channel time" from the 24-channel RDATA bus by the familiar latch 832. With reference yet to FIG. 11 it should be observed that the serial to parallel (SP) converter 622 is provided for coupling the switched 8-bit serial word to UART 610 as a 7-bit parallel word. The first data bit of the switched 8-bit data word (always being a logic zero) is recognized for use in controlling the clocking means 624–630 of the serial to parallel (SP) converter 622. In essence, the first bit of the word, being a logic zero, starts the clocking means, but due to the particular structure of the means, clock pulses appear at the CLK input of SP converter 622 one frame (125 microseconds) later. Thus, while the first data bit appears at the input of the SP converter 622, such bit is not entered therein as the converter is yet prohibited from being clocked. It should be appreciated from the foregoing that this aspect of the illustrated embodiment assures that the first data bit (zero) of each switched serial 8-bit word will not be processed by UART 610 as data information. Essentially, the number of bits which do not comprise data information but are required as format overhead bits has been reduced from three bits (one start, two stop bits) to the bare minimum of one bit. This net result alone allows a 9600 bps data rate to be accommodated by an 8000 bps system.

With regard to the particular operation of the serial to parallel converter clocking circuit 624, 626, 628, it should be observed from viewing FIG. 11 that the first appearance of a logic low, as in the case of the first bit of a data word, clears the D-type latch 624. A logic zero then appears at the Q output of the latch 624 thereby clearing the frame counter 626 and the word bit counter 628 and allowing the frame counter 626 to commence counting in accordance with the 128 Khz rate coupled to its CLK input. Because the interface SP converter 622 CLK input is connected to the Qd output of the frame counter 626, no activity occurs thereon until the 128 Khz clock has been divided by sixteen. Coincidentally, the 128 Khz rate, synchronized with the system clock, and divided by sixteen results in a waveform repetitively occuring at 125 microsecond intervals—the system frame interval. Therefore, it is observed that only after one frame interval the interface SP converter 622 is clocked to enter the first of seven data bits. However, the first clocked bit is actually the second bit of the switched serial data word.

In a similar manner, the frame counter 626 allows the SP converter 622 to enter each of the remaining six bits, sequentially latched one at a time by the storage element 832, in the next six framing intervals. While the six framing intervals are being tracked by the frame counter 626, it should be observed that the word bit counter 628 is connected to count the number of word bits that have expired. The Qd output of the word bit counter 628 provides an indication of the occurrence of the eighth frame which, when timed with the $Q_A$ frame counter output, causes the D-type latch 624 to stop the counting process by forcing a high on the counters' CLR inputs. Specifically, the coincidence of frame counter positive QA output, and the word counter positive $Q_D$ output causes the output of gate 630 to clock the D-latch 624 to thereby transfer the D-input state (logic high) to the Q output and inhibit the two counters from further counting. The clock means is thereby prepared for the recognition of the first bit of the succeeding 8-bit word.

It may readily be noticed that after the last data bit has been clocked into the SP converter 622 the clocking mechanism remains inactive until a digital zero is encountered, in which event the D-latch 624 sets into action another cycle. For this very reason, and as heretofore explained, the time slots between data words, if any, must be filled with bits distinguishable from the foremost word bit. In the instant example the inter-word time slots are filled with digital ones which remain transparent to the D-latch 624. Of course, the leading word bit time slot and the inter-word time slots may be filled with one/zero combinations respectively or, in the event multiple format bits precede the data bits, schemes to detect distinguishing patterns of bits may be implemented.

In a similar vein, the activation of the word counter $Q_D$ output drives the UART 610 TBRL input high so that the now parallelized 7-bit word, can be entered into the UART. In accordance with the normal operating characteristics of UARTs, the 7-bit word is serialized, and in the transmit section thereof, the requisite EIA start and stop bits are inserted. Importantly, the UART can be programmed to select a desired transmit format to accommodate seven data bits and thus to ignore parallel input $TBR_8$. The transmit portion, being driven by a 153.6 Khz clock, transmits the serialized word at a 9600 bps rate. As previously noted, the referenced Harris UART transmits at a rate equal to the clock rate divided by sixteen. Lastly, the interface logic 825 transforms the 5-volt logic levels to new voltages compatible with EIA transmission standards. The foregoing process is repeatedly executed for all successive 9600 bps serial data words being switched between an input data port and a destination data port.

In summary, it is thus observed that the 9600 bps data information is comprised of an excess number of format bits which are unnecessary to a switching system and thus can be stripped from the data information, and the result thereof switched through a digital network at an 8 Khz rate.

While the exemplary embodiment of FIG. 11 is described in terms of EIA 10-bit words being converted to 8-bit words for switching, those skilled in the art, along with teachings of the invention herein disclosed, will appreciate that the particular format described is not critical to the present invention and will be able to modify the illustrated circuit to accommodate other data word formats. The end result of this achievement is the capability to switch data with external transmission rates somewhat higher than the switching system rate.

Accordingly, what we claim is:

1. In a time division multiplex switching system of the type having a plurality of voice access ports each having a voice path and a signalling path, transmit and receive voice buses each having a cyclic sequence of time channels, for carrying voice information to and from the voice ports, a plurality of registers, transmit and receive signalling buses each having a cyclic sequence of time channels for carrying signalling information from said voice ports and to said registers, respectively, a common control, a switching network having a voice section for switching voice information between said transmit and receive voice buses, and a network signalling section for switching signalling information between said transmit and receive signalling buses, an improvement for switching data between a data transmit line and a data receive line, comprising:

a transmit data port means for coupling data information from said data transmit line into a predetermined time channel of said transmit signalling bus, and includes:
multiple transmit data ports, each associated with a difference one of the signalling paths in said set of access ports,
logic means for combining information from each of said signalling paths with information from the associated transmit data port, and
means for multiplexing the said combined information from each of the said signalling paths and associated data ports into predetermined channels of said transmit signalling bus;
receive data bus means, including said receive signalling bus and having a cyclic sequence of time channels, for carrying data information switched by said network signalling section,
a receive data port means for coupling data information from a selected time channel of said receive data bus means to said data receive line, and includes:
multiple receive data ports, each associated with a different one of the voice access ports in said set, and
means for demultiplexing switched data information from said receive data bus means time channels to corresponding ones of said receive data ports,
wherein each said voice bus time channel corresponds to a different voice access port, and wherein each said signalling bus time channel corresponds to a different data port, and further the information on each voice port time channel and on each time channel of the associated data port are synchronized to appear in time coincidence throughout the switching system,
whereby each said voice access port having a data port is capable of transmit and receive voice information communication and simultaneous transmit and receive data information, and
whereby the signalling portion of said system is utilized in switching data information from said data transmit line to said data receive line.

2. The improvement as set forth in claim 1 wherein said transmit data port means further includes means, responsive to an OFF-HOOK indication on one of said signalling paths, for enabling data information to be coupled from said data transmit line to said transmit signalling bus.

3. The improvement as set forth in claim 1 wherein said receive data port means is associated with a set of said voice access ports, and includes
multiple receive data ports, each associated with a different one of the voice access ports in said set, and
means for demultiplexing switched data information from said receive data bus means time channels to corresponding ones of said receive data ports.

4. The improvement of claim 1, wherein said receive data bus means includes means for connecting said signalling bus to said receive data port means.

5. The improvement as set forth in claim 1 wherein said network voice section and signalling section are comprised of random access memories, and said system further includes,
memory address means, responsive to said common control, for accessing random access memory locations in said voice section to switch information located therein to thereby effect a connection between an originating voice port and a destination voice port,
memory address means for generating network signalling section addresses, which locations are associated with said voice section locations in such a way that data information appearing at the data transmit line associated with said originating voice port is switched to the data receive line associated with said destination voice port.

6. The improvement as set forth in claim 5 wherein said random access memories include one addressable storage location for storing information from each combination of voice access port and associated data port, and wherein each network voice section is comprised of a plurality of cells within each said addressable location for storing voice information, and the network signalling section is comprised of at least one other cell within each said addressable location for storing data information.

7. The improvement as set forth in claim 6 wherein each of said random access memory addressable storage locations is comprised of eight cells for storing voice information and at least one cell for storing data information.

8. The improvement as set forth in claim 6 wherein, for each voice bus time channel and associated signalling bus time channel, the voice section memory address means and signalling section memory address means are comprised of the same memory address means for generating the same address for each storage location, whereby for each memory address generated, both voice information and data information are switched by said network.

9. The improvement as set forth in claim 1, wherein the sum of the information on each voice port time channel and its associated data port time channel is equivalent to a single n-bit word.

10. The improviement as set forth in claim 1, wherein the instantaneous information on the data port time channel is one bit.

11. A method of switching data information in a time division multiplex switching system of the type having a plurality of voice access ports, each said port having a voice interface and signalling interface, a switching network for switching voice information in a voice section thereof and for switching signalling information in a signalling section thereof, a transmit voice bus and a receive boice bus for carrying voice information between the voice interfaces and the voice section of said network, the transmit and receive voice buses having a cyclic sequence of time slots wherein each said time slot is associated with one of said voice access ports, a transmit signalling bus and a receive signalling bus for carrying signalling information between the signal interfaces and the signalling section of said network, the transmit and receive signalling buses having a cyclic sequence of time slots wherein each said time slot is associated with one of said voice access ports, said method comprising the steps of:

synchronizing data information with desired time slots of said transmit signalling bus, imposing the synchronized data information into said desired time slots, switching the data information in said network signalling section from said desired time slots to other time slots of said receive signalling bus, and receiving information from the data lines at data ports each associated with a different one of said voice access ports, associating each time slot of said transmit signalling bus with a time slot of said receive signalling bus, and with one of said data ports, synchronizing the time slots of said transmit voice bus and said receive voice bus with the time slots of the associated transmit signalling bus and receive signalling bus, whereby voice information from each voice access port and data information from each said associated data part appear in time coincident time slots, and extracting the switched data information from said other time slots.

12. The method as set forth in claim 11 further including a switching step including, for each voice access port and associated data port, switching voice information and data information through the same network connection whereby both types of information are routed from an originating voice access and associated data port to a destination voice access and associated data port.

13. The method as set forth in claim 12 wherein said switching step further comprises;

for each voice bus time slot and time coincident signalling bus time slot, forming a parallel word therefrom having voice information bits and data information bits, writing said parallel word, during each said coincident time slot, into the respective voice and signalling section of said network memory, reading said parallel word, during other time coincident time slots, from the respective voice and signalling sections of said network memory.

* * * * *